United States Patent
Myneni et al.

(10) Patent No.: US 12,197,971 B2
(45) Date of Patent: Jan. 14, 2025

(54) TEMPLATE DRIVEN APPROACH TO DEPLOY A MULTI-SEGMENTED APPLICATION IN AN SDDC

(71) Applicant: VMware LLC, Palo Alto, CA (US)

(72) Inventors: Sirisha Myneni, Santa Clara, CA (US); Arijit Chanda, San Jose, CA (US); Laxmikant Vithal Gunda, San Jose, CA (US); Arnold Koon-Chee Poon, San Mateo, CA (US); Farzad Ghannadian, Burlingame, CA (US); Kausum Kumar, Los Gatos, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/397,936

(22) Filed: Aug. 9, 2021

(65) Prior Publication Data

US 2021/0365308 A1 Nov. 25, 2021

Related U.S. Application Data

(63) Continuation of application No. 16/112,408, filed on Aug. 24, 2018, now Pat. No. 11,086,700.

(51) Int. Cl.
*G06F 9/54* (2006.01)
*G06F 8/60* (2018.01)
*H04L 9/40* (2022.01)

(52) U.S. Cl.
CPC ............... *G06F 9/546* (2013.01); *G06F 8/60* (2013.01); *H04L 63/029* (2013.01)

(58) Field of Classification Search
None
See application file for complete search history.

(56) References Cited

U.S. PATENT DOCUMENTS

| | | | |
|---|---|---|---|
| 6,697,360 B1 | 2/2004 | Gai et al. | |
| 7,440,408 B1 * | 10/2008 | Anderson | ............... H04L 41/12 370/254 |

(Continued)

FOREIGN PATENT DOCUMENTS

| | | |
|---|---|---|
| AU | 2004227600 B2 | 5/2009 |
| AU | 2022201625 A1 | 3/2022 |

(Continued)

OTHER PUBLICATIONS

Author Unknown, "OpenShift Container Platform 4.6," Mar. 3, 2021, 41 pages, Red Hat, Inc.

(Continued)

*Primary Examiner* — Umut Onat
(74) *Attorney, Agent, or Firm* — Quarles & Brady LLP

(57) ABSTRACT

Some embodiments of the invention provide a simplified mechanism to deploy and control a multi-segmented application by using application-based manifests that express how application segments of the multi-segment application are to be defined or modified, and how the communication profiles between these segments. In some embodiments, these manifests are application specific. Also, in some embodiments, deployment managers in a software defined datacenter (SDDC) provide these manifests as templates to administrators, who can use these templates to express their intent when they are deploying multi-segment applications in the datacenter. Application-based manifests can also be used to control previously deployed multi-segmented applications in the SDDC. Using such manifests would enable the administrators to be able to manage fine grained microsegmentation rules based on endpoint and network attributes.

20 Claims, 16 Drawing Sheets

(56) References Cited

U.S. PATENT DOCUMENTS

| | | |
|---|---|---|
| 7,869,439 B1 | 1/2011 | Ramberg et al. |
| 7,890,543 B2 | 2/2011 | Hunt et al. |
| 7,912,955 B1 | 3/2011 | Machiraju et al. |
| 8,627,442 B2 | 1/2014 | Ji et al. |
| 8,683,560 B1 | 3/2014 | Brooker et al. |
| 9,152,803 B2 | 10/2015 | Biswas et al. |
| 9,225,638 B2 | 12/2015 | Jain et al. |
| 9,258,312 B1 | 2/2016 | O'Neill et al. |
| 9,531,590 B2 | 12/2016 | Jain et al. |
| 9,536,077 B2 | 1/2017 | Bignon et al. |
| 9,590,901 B2 | 3/2017 | Tubaltsev et al. |
| 9,594,546 B1 | 3/2017 | Todd et al. |
| 9,674,275 B1 | 6/2017 | Engers et al. |
| 9,755,898 B2 | 9/2017 | Jain et al. |
| 9,774,537 B2 | 9/2017 | Jain et al. |
| 9,813,509 B1 | 11/2017 | Visser et al. |
| 9,825,810 B2 | 11/2017 | Jain et al. |
| 9,935,827 B2 | 4/2018 | Jain et al. |
| 9,979,641 B2 | 5/2018 | Jain et al. |
| 10,095,669 B1 | 10/2018 | Karppanen |
| 10,122,735 B1 | 11/2018 | Wohlgemuth |
| 10,129,077 B2 | 11/2018 | Jain et al. |
| 10,135,737 B2 | 11/2018 | Jain et al. |
| 10,193,977 B2 | 1/2019 | Ke et al. |
| 10,205,701 B1 | 2/2019 | Voss et al. |
| 10,225,137 B2 | 3/2019 | Jain et al. |
| 10,257,095 B2 | 4/2019 | Jain et al. |
| 10,270,796 B1 | 4/2019 | Veeraswamy et al. |
| 10,320,679 B2 | 6/2019 | Jain et al. |
| 10,341,233 B2 | 7/2019 | Jain et al. |
| 10,496,605 B2 | 12/2019 | Melnik et al. |
| 10,516,568 B2 | 12/2019 | Jain et al. |
| 10,547,521 B1 | 1/2020 | Roy et al. |
| 10,594,743 B2 | 3/2020 | Hong et al. |
| 10,609,091 B2 | 3/2020 | Hong et al. |
| 10,613,888 B1 | 4/2020 | Mentz et al. |
| 10,628,144 B2 | 4/2020 | Myneni et al. |
| 10,652,143 B2 | 5/2020 | Ravinoothala et al. |
| 10,693,782 B2 | 6/2020 | Jain et al. |
| 10,708,368 B1 | 7/2020 | Young et al. |
| 10,725,836 B2 | 7/2020 | Savenkov et al. |
| 10,795,909 B1 | 10/2020 | Bond et al. |
| 10,812,337 B2 | 10/2020 | Vaidya et al. |
| 10,841,226 B2 | 11/2020 | Mariappan et al. |
| 10,860,444 B2 | 12/2020 | Natanzon |
| 10,942,788 B2 | 3/2021 | Palavalli et al. |
| 10,944,691 B1 | 3/2021 | Raut et al. |
| 10,951,661 B1 | 3/2021 | Medan et al. |
| 10,972,341 B2 | 4/2021 | Mudigonda |
| 10,972,386 B2 | 4/2021 | Mackie et al. |
| 11,074,091 B1 | 7/2021 | Nayakbomman et al. |
| 11,086,700 B2 | 8/2021 | Myneni et al. |
| 11,159,366 B1 | 10/2021 | Gawade et al. |
| 11,190,491 B1 | 11/2021 | Kaciulis et al. |
| 11,194,483 B1 | 12/2021 | Dontu et al. |
| 11,277,309 B2 | 3/2022 | Vaidya et al. |
| 11,316,822 B1 | 4/2022 | Gawade et al. |
| 11,436,057 B2 | 9/2022 | Shen et al. |
| 11,500,688 B2 | 11/2022 | Liu et al. |
| 11,570,146 B2 | 1/2023 | Liu et al. |
| 11,606,254 B2 | 3/2023 | Liu et al. |
| 11,671,400 B2 | 6/2023 | Zhou et al. |
| 11,671,401 B2 | 6/2023 | Singh et al. |
| 11,689,425 B2 | 6/2023 | Vaidya et al. |
| 11,689,497 B2 | 6/2023 | Shen et al. |
| 11,748,170 B2 | 9/2023 | Palavalli et al. |
| 2004/0098154 A1 | 5/2004 | McCarthy |
| 2005/0129019 A1 | 6/2005 | Cheriton |
| 2007/0244962 A1 | 10/2007 | Laadan et al. |
| 2007/0245334 A1 | 10/2007 | Nieh et al. |
| 2007/0251998 A1* | 11/2007 | Belenki ............... H04L 67/12 235/380 |
| 2010/0149996 A1 | 6/2010 | Sun |
| 2010/0177674 A1 | 7/2010 | Aggarwal |
| 2010/0211815 A1 | 8/2010 | Mankovskii et al. |
| 2010/0246545 A1 | 9/2010 | Berzin |
| 2010/0293378 A1 | 11/2010 | Xiao et al. |
| 2011/0161988 A1 | 6/2011 | Kashyap |
| 2011/0194494 A1 | 8/2011 | Aso et al. |
| 2011/0282936 A1 | 11/2011 | Chekhanovskiy et al. |
| 2011/0289508 A1 | 11/2011 | Fell et al. |
| 2012/0079489 A1* | 3/2012 | Charrad ............... G16H 40/20 718/102 |
| 2012/0117226 A1 | 5/2012 | Tanaka et al. |
| 2012/0150912 A1 | 6/2012 | Ripberger |
| 2012/0304275 A1 | 11/2012 | Ji et al. |
| 2013/0018994 A1 | 1/2013 | Flavel et al. |
| 2013/0019314 A1 | 1/2013 | Ji et al. |
| 2013/0125230 A1 | 5/2013 | Koponen et al. |
| 2013/0174168 A1 | 7/2013 | Abuelsaad et al. |
| 2013/0266019 A1 | 10/2013 | Qu et al. |
| 2013/0283339 A1 | 10/2013 | Biswas et al. |
| 2014/0036730 A1 | 2/2014 | Nellikar et al. |
| 2014/0129690 A1 | 5/2014 | Jaisinghani et al. |
| 2014/0164897 A1 | 6/2014 | Yucel et al. |
| 2014/0223556 A1 | 8/2014 | Bignon et al. |
| 2014/0237100 A1 | 8/2014 | Cohn et al. |
| 2014/0258479 A1 | 9/2014 | Tenginakai et al. |
| 2015/0063166 A1 | 3/2015 | Sif et al. |
| 2015/0081767 A1 | 3/2015 | Evens |
| 2015/0100704 A1 | 4/2015 | Davie et al. |
| 2015/0172093 A1 | 6/2015 | Kaneko et al. |
| 2015/0222598 A1 | 8/2015 | Koponen et al. |
| 2015/0249574 A1 | 9/2015 | Zhang |
| 2015/0263899 A1 | 9/2015 | Tubaltsev et al. |
| 2015/0263946 A1 | 9/2015 | Tubaltsev et al. |
| 2015/0317169 A1 | 11/2015 | Sinha et al. |
| 2015/0348044 A1 | 12/2015 | Smith |
| 2015/0379281 A1 | 12/2015 | Feroz et al. |
| 2016/0036860 A1 | 2/2016 | Xing et al. |
| 2016/0080422 A1 | 3/2016 | Belgodere et al. |
| 2016/0094454 A1 | 3/2016 | Jain et al. |
| 2016/0094457 A1 | 3/2016 | Jain et al. |
| 2016/0094650 A1 | 3/2016 | Rio |
| 2016/0094661 A1 | 3/2016 | Jain et al. |
| 2016/0182293 A1 | 6/2016 | Benedetto et al. |
| 2016/0217301 A1 | 7/2016 | Watanabe et al. |
| 2016/0239326 A1 | 8/2016 | Kaplan et al. |
| 2016/0241436 A1 | 8/2016 | Fourie et al. |
| 2016/0254964 A1 | 9/2016 | Benc |
| 2016/0269318 A1 | 9/2016 | Su et al. |
| 2016/0294612 A1 | 10/2016 | Ravinoothala et al. |
| 2016/0315809 A1* | 10/2016 | McMurry ........... H04L 41/0806 |
| 2016/0335129 A1 | 11/2016 | Behera et al. |
| 2016/0337334 A1 | 11/2016 | Murr |
| 2017/0005923 A1 | 1/2017 | Babakian |
| 2017/0005986 A1 | 1/2017 | Bansal et al. |
| 2017/0031956 A1 | 2/2017 | Burk et al. |
| 2017/0063632 A1 | 3/2017 | Goliya et al. |
| 2017/0063782 A1 | 3/2017 | Jain et al. |
| 2017/0085561 A1 | 3/2017 | Han et al. |
| 2017/0093790 A1 | 3/2017 | Banerjee et al. |
| 2017/0171144 A1 | 6/2017 | Sagiraju et al. |
| 2017/0177394 A1 | 6/2017 | Barzik et al. |
| 2017/0195210 A1 | 7/2017 | Jacob et al. |
| 2017/0206034 A1 | 7/2017 | Fetik |
| 2017/0207963 A1 | 7/2017 | Mehta et al. |
| 2017/0258479 A1 | 9/2017 | Hänni et al. |
| 2017/0286698 A1 | 10/2017 | Shetty et al. |
| 2017/0317954 A1 | 11/2017 | Masurekar et al. |
| 2017/0324781 A1 | 11/2017 | Hu et al. |
| 2017/0332307 A1 | 11/2017 | Pan |
| 2017/0353351 A1 | 12/2017 | Cheng et al. |
| 2017/0366416 A1 | 12/2017 | Beecham et al. |
| 2017/0374106 A1 | 12/2017 | Hamou et al. |
| 2018/0019969 A1 | 1/2018 | Murthy |
| 2018/0063194 A1 | 3/2018 | Vaidya et al. |
| 2018/0083835 A1 | 3/2018 | Cole et al. |
| 2018/0089299 A1 | 3/2018 | Collins et al. |
| 2018/0114012 A1 | 4/2018 | Sood et al. |
| 2018/0123943 A1 | 5/2018 | Lee et al. |
| 2018/0131675 A1 | 5/2018 | Sengupta et al. |
| 2018/0167453 A1 | 6/2018 | Luo |
| 2018/0167458 A1 | 6/2018 | Ould-Brahim et al. |

(56) References Cited

U.S. PATENT DOCUMENTS

| | | |
|---|---|---|
| 2018/0167487 A1 | 6/2018 | Vyas et al. |
| 2018/0183757 A1 | 6/2018 | Gunda et al. |
| 2018/0205605 A1 | 7/2018 | Mittal et al. |
| 2018/0234459 A1 | 8/2018 | Kung et al. |
| 2018/0248827 A1 | 8/2018 | Scharber et al. |
| 2018/0262424 A1 | 9/2018 | Roeland et al. |
| 2018/0287996 A1 | 10/2018 | Tripathy et al. |
| 2018/0295036 A1 | 10/2018 | Krishnamurthy et al. |
| 2018/0331885 A1 | 11/2018 | Raymond et al. |
| 2018/0359323 A1 | 12/2018 | Madden |
| 2019/0034237 A1 | 1/2019 | Siddappa et al. |
| 2019/0036868 A1 | 1/2019 | Chandrashekhar et al. |
| 2019/0042518 A1 | 2/2019 | Marolia et al. |
| 2019/0068500 A1 | 2/2019 | Hira |
| 2019/0068544 A1 | 2/2019 | Hao et al. |
| 2019/0079751 A1 | 3/2019 | Foskett et al. |
| 2019/0097879 A1 | 3/2019 | Cai et al. |
| 2019/0102280 A1 | 4/2019 | Caldato et al. |
| 2019/0103992 A1* | 4/2019 | Cidon .................. H04L 12/1403 |
| 2019/0132220 A1 | 5/2019 | Boutros et al. |
| 2019/0132221 A1 | 5/2019 | Boutros et al. |
| 2019/0132283 A1 | 5/2019 | Ballard et al. |
| 2019/0140895 A1 | 5/2019 | Ennis, Jr. et al. |
| 2019/0140921 A1 | 5/2019 | Xu et al. |
| 2019/0149512 A1 | 5/2019 | Sevinc et al. |
| 2019/0149516 A1 | 5/2019 | Rajahalme et al. |
| 2019/0149518 A1 | 5/2019 | Sevinc et al. |
| 2019/0171650 A1 | 6/2019 | Botev et al. |
| 2019/0173780 A1 | 6/2019 | Hira et al. |
| 2019/0213004 A1* | 7/2019 | Zhu .......................... H04L 67/34 |
| 2019/0229987 A1 | 7/2019 | Shelke et al. |
| 2019/0230126 A1 | 7/2019 | Kumar et al. |
| 2019/0238363 A1 | 8/2019 | Boutros et al. |
| 2019/0238364 A1 | 8/2019 | Boutros et al. |
| 2019/0245757 A1* | 8/2019 | Meyer ..................... H04L 47/70 |
| 2019/0273683 A1 | 9/2019 | Jiang et al. |
| 2019/0288947 A1 | 9/2019 | Jain et al. |
| 2019/0306036 A1 | 10/2019 | Boutros et al. |
| 2019/0306086 A1 | 10/2019 | Boutros et al. |
| 2019/0356693 A1 | 11/2019 | Cahana et al. |
| 2019/0384645 A1 | 12/2019 | Palavalli et al. |
| 2019/0386877 A1 | 12/2019 | Vaidya et al. |
| 2020/0065080 A1 | 2/2020 | Myneni et al. |
| 2020/0065166 A1 | 2/2020 | Myneni et al. |
| 2020/0073692 A1 | 3/2020 | Rao et al. |
| 2020/0076684 A1 | 3/2020 | Naveen et al. |
| 2020/0076685 A1 | 3/2020 | Vaidya et al. |
| 2020/0076734 A1 | 3/2020 | Naveen et al. |
| 2020/0084112 A1 | 3/2020 | Kandaswamy et al. |
| 2020/0092275 A1 | 3/2020 | Seed et al. |
| 2020/0112504 A1 | 4/2020 | Osman |
| 2020/0213366 A1 | 7/2020 | Hong et al. |
| 2020/0250009 A1 | 8/2020 | Jaeger et al. |
| 2020/0250074 A1 | 8/2020 | Zhang et al. |
| 2020/0252376 A1 | 8/2020 | Feng et al. |
| 2020/0301801 A1 | 9/2020 | Hegde |
| 2020/0314006 A1 | 10/2020 | Mackie et al. |
| 2020/0314173 A1 | 10/2020 | Pahwa et al. |
| 2020/0344120 A1 | 10/2020 | Pianigiani et al. |
| 2020/0366558 A1 | 11/2020 | Vaidya et al. |
| 2020/0374186 A1 | 11/2020 | Scott |
| 2020/0379812 A1 | 12/2020 | Ranjan et al. |
| 2020/0382556 A1 | 12/2020 | Woolward et al. |
| 2020/0401457 A1 | 12/2020 | Singhal et al. |
| 2020/0403853 A1 | 12/2020 | Garipally et al. |
| 2020/0403860 A1 | 12/2020 | Lewis et al. |
| 2020/0409671 A1 | 12/2020 | Mazurskiy |
| 2021/0004292 A1 | 1/2021 | Zlotnick et al. |
| 2021/0064442 A1 | 3/2021 | Alluboyina et al. |
| 2021/0099335 A1 | 4/2021 | Li |
| 2021/0165695 A1 | 6/2021 | Palavalli et al. |
| 2021/0200814 A1 | 7/2021 | Tal et al. |
| 2021/0218652 A1 | 7/2021 | Raut et al. |
| 2021/0243164 A1 | 8/2021 | Murray et al. |
| 2021/0273946 A1 | 9/2021 | Iqbal et al. |
| 2021/0306285 A1 | 9/2021 | Hirasawa et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314300 A1 | 10/2021 | Shen et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0352044 A1 | 11/2021 | Asveren et al. |
| 2021/0397466 A1 | 12/2021 | McKee et al. |
| 2021/0409336 A1 | 12/2021 | Talur et al. |
| 2022/0012045 A1 | 1/2022 | Rudraraju et al. |
| 2022/0035651 A1 | 2/2022 | Maurya et al. |
| 2022/0038311 A1 | 2/2022 | Shen et al. |
| 2022/0070250 A1 | 3/2022 | Baid et al. |
| 2022/0091868 A1 | 3/2022 | Malleni et al. |
| 2022/0158926 A1 | 5/2022 | Wennerström et al. |
| 2022/0182439 A1 | 6/2022 | Zhou et al. |
| 2022/0200865 A1 | 6/2022 | Vaidya et al. |
| 2022/0210113 A1 | 6/2022 | Pillareddy et al. |
| 2022/0278926 A1 | 9/2022 | Sharma et al. |
| 2022/0303246 A1 | 9/2022 | Miriyala et al. |
| 2022/0311738 A1 | 9/2022 | Singh et al. |
| 2022/0321495 A1 | 10/2022 | Liu et al. |
| 2022/0400053 A1 | 12/2022 | Liu et al. |
| 2023/0043362 A1 | 2/2023 | Kita et al. |
| 2023/0070224 A1 | 3/2023 | Huo et al. |
| 2023/0104568 A1 | 4/2023 | Miriyala et al. |
| 2023/0179484 A1 | 6/2023 | Liu et al. |
| 2023/0179573 A1 | 6/2023 | Sosnovich et al. |
| 2023/0231741 A1 | 7/2023 | Tang et al. |
| 2023/0231827 A1 | 7/2023 | Tang et al. |
| 2023/0244591 A1 | 8/2023 | Sun et al. |

FOREIGN PATENT DOCUMENTS

| | | |
|---|---|---|
| CA | 3107455 A1 | 2/2020 |
| CN | 105897946 A | 8/2016 |
| CN | 106789367 A | 5/2017 |
| CN | 107947961 A | 4/2018 |
| CN | 110531987 A | 12/2019 |
| CN | 110611588 A | 12/2019 |
| CN | 111327640 A | 6/2020 |
| CN | 111371627 A | 7/2020 |
| CN | 111865643 A | 10/2020 |
| CN | 113141386 A | 7/2021 |
| EP | 2464151 A2 | 6/2012 |
| EP | 2464152 A2 | 6/2012 |
| EP | 2830270 A1 | 1/2015 |
| EP | 3316532 A1 | 5/2018 |
| EP | 3617879 A1 | 3/2020 |
| EP | 3814904 A1 | 5/2021 |
| IN | 108809722 A | 11/2018 |
| JP | 2011070707 A | 4/2011 |
| JP | 2012099048 A | 5/2012 |
| JP | 2014535213 A | 12/2014 |
| JP | 2015115043 A | 6/2015 |
| JP | 2018523932 A | 8/2018 |
| WO | 2011159842 A2 | 12/2011 |
| WO | 2013063330 A1 | 5/2013 |
| WO | 2016160523 A1 | 10/2016 |
| WO | 2018044341 A1 | 3/2018 |
| WO | 2018044352 A1 | 3/2018 |
| WO | 2019241086 A1 | 12/2019 |
| WO | 2020041073 A1 | 2/2020 |
| WO | 2020041074 A1 | 2/2020 |
| WO | 2021196080 A1 | 10/2021 |
| WO | 2022026028 A1 | 2/2022 |
| WO | 2022204941 A9 | 10/2022 |
| WO | 2023133797 A1 | 7/2023 |

OTHER PUBLICATIONS

Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.

(56) References Cited

OTHER PUBLICATIONS

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.
Sayfan, Gigi, "Mastering Kubernetes: Automating container deployment and management," May 2017, 426 pages, Packt Publishing, Birmingham, UK.
Wodicka, Brent, "A Developer's Guide to Container Orchestration, Kubernetes, & AKS," Mar. 19, 2019, 5 pages, AIS, Reston, VA, USA.
Abhashkumar, Anubhavnidhi, et al., "Supporting Diverse Dynamic Intent-based Policies Using Janus," CoNEXT 17, Dec. 12-15, 2017, 14 pages, ACM, Incheon, KR.
Abwnawar, Nasser, "A Policy-Based Management Approach to Security in Cloud Systems," Feb. 2020, 184 pages, De Monfort University, Leicester, UK.
Author Unknown, "E-Security Begins with Sound Security Policies," Jun. 14, 2001, 23 pages, Symantec Corporation.
Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.
PCT International Search Report and Written Opinion of Commonly Owned International Patent Application PCT/US2019/046565, mailed Oct. 29, 2019, 12 pages, International Searching Authority (EPO).
Rouse, Margaret, "What is SDDC (software-defined data center)?—Definition from WhatIs.com," Mar. 2017, 5 pages, TechTarget.com.
Author Unknown, "Advanced Networking Features in Kubernetes and Container Bare Metal," Document 606835-001, Dec. 2018, 42 pages, Intel Corporation.
Author Unknown, "Chapter 4: Default Security Policy," IBM Security Access Manager Version 9.0, Oct. 2015, 18 pages.
Author Unknown, "Containers and Container Networking for Network Engineers: VMware NSX Container Networking," Jan. 2018, 58 pages, VMware, Inc.
Balla, David, et al., "Adaptive Scaling of Kubernetes Pods," NOMS 2020—2020 IEEE/IFIP Network Operations and Management Symposium, Apr. 20-24, 2020, 5 pages, IEEE, Budapest, Hungary.
Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.
Author Unknown, "NSX vSphere API Guide—NSX 6.2 for vSphere," Jan. 6, 2017, 400 pages, VMware, Inc.
Author Unknown, "Assign Memory Resources to Containers and Pods," Oct. 17, 2020, 7 pages.
Author Unknown, "NSX and Micro-segmentation," Jan. 3, 2017, 2 pages, retrieved from https://www.youtube.com/watch?v=1_QtlSXaxkE.
Author Unknown, "NSX Policy API: Getting Started Guide," Technical White Paper, Sep. 2019, 28 pages, VMware, Inc.
Author Unknown, "VMware NSX for vSphere 6.4—Application Rule Manager Enhancements," Jan. 20, 2018, 2 pages, retrieved from https://www.youtube.com/watch?v=r3IKNkt5mi8.
Author Unknown, "VMware NSX-T 2.4: Advancing NSX Everywhere for Everyone," Feb. 27, 2019, 2 pages, retrieved from https://www.youtube.com/watch?v=IqPyRBWABHg.
Patni, Sanjay, "Pro RESTful APIs," Month Unknown 2017, 136 pages, Apress, New York City, NY, USA.

\* cited by examiner

```
PATCH : policy/api/v1/templates/SlackTemplate
{                                           401
"_revision":0,                              402
"display_name":"Slack Application Manifest",
"description":"Application Manifest",       403
"template_placeholders":[        404
],
"template_body":{        405
    "resource_type":"Infra",
    "_revision":0,
    "display_name":"Infra",
    "description":"Policy Infra",
    "children":[                  410
    {
        "resource_type":"ChildDomain",
        "Domain":{
            "_revision":0,
            "resource_type": "Domain",
            "id":"slack_app",
            "description":"Policy Domain",
            "children":[            415
            {
                "resource_type":"ChildGroup",
                "Group":{
                    "_revision":0,
                    "id":"slack-sharing",
                    "resource_type":"Group",
                    "description":"Policy Group",
                    "expression":[
                    {
                        "resource_type":"Condition",
                        "member_type":"VirtualMachine",
                        "key":"Tag", "operator":"CONTAINS",
                        "value":"slack-sharing"
                    }
                    ]
                }
            },
```

```
{                                          420
    "resource_type":"ChildGroup",
    "Group":{
        "_revision":0,
        "id":"slack-base",
        "resource_type":"Group",
        "description":"Policy Group",
        "expression":[
            {
                "resource_type":"Condition",
                "member_type":"VirtualMachine",
                "key":"Tag",
                "operator":"CONTAINS",
                "value":"slack-base"
            }
        ]
    }                                      425
},
{
    "resource_type":"ChildGroup",
    "Group":{
        "_revision":0,
        "id":"slack-call",
        "resource_type":"Group",
        "description":"Policy Group",
        "expression":[
            {
                "resource_type":"Condition",
                "member_type":"VirtualMachine",
                "key":"Tag",
                "operator":"CONTAINS",
                "value":"slack-call"
            }
        ]
    }                                      430
},
{
    "resource_type":"ChildGroup",
    "Group":{
        "_revision":0,
        "id":"slack-editing",
        "resource_type":"Group",
        "description":"Policy Group",
        "expression":[
            {
                "resource_type":"Condition",
                "member_type":"VirtualMachine",
                "key":"Tag",
                "operator":"CONTAINS",
                "value":"slack-editing"
            }
        ]
    }
},
```

*Figure 4B*

```
{                                               435
    "resource_type":"ChildGroup",
    "Group":{
        "_revision":0,
        "id":"slack-downloading",
        "resource_type":"Group",
        "description":"Policy Group",
        "expression":[
            {
                "resource_type":"Condition",
                "member_type":"VirtualMachine",
                "key":"Tag",
                "operator":"CONTAINS",
                "value":"slack-downloading"
            }
        ]
    }
},                                              440
{
    "resource_type":"ChildGroup",
    "Group":{
        "_revision":0,
        "id":"slack-uploading",
        "resource_type":"Group",
        "description":"Policy Group",
        "expression":[
            {
                "resource_type":"Condition",
                "member_type":"VirtualMachine",
                "key":"Tag",
                "operator":"CONTAINS",
                "value":"slack-uploading"
            }
        ]
    }
},                                              445
{
    "resource_type":"ChildGroup",
    "Group":{
        "_revision":0,
        "id":"slack-file-transfer",
        "resource_type":"Group",
        "description":"Policy Group",
        "expression":[
            {
                "resource_type":"Condition",
                "member_type":"VirtualMachine",
                "key":"Tag",
                "operator":"CONTAINS",
                "value":"slack-file-transfer"
            }
        ]
    }
},
```

*Figure 4C*

```
                                                              450
                {                                             /
                  "resource_type":"ChildCommunicationMap",
                  "CommunicationMap":{
                     "_revision":0,
                     "resource_type":"CommunicationMap",
                     "id":"communication_map",
                     "description":"Policy Communication Map",
                     "precedence":1,
                     "communication_entries":[
                        {                                     455
                           "_revision":0,                     /
                           "resource_type":"CommunicationEntry",
                           "id":"slack_sharing",
                           "source_groups":["/infra/domains/SlackApplicationDomain/groups/slack-sharing"],
                           "destination_groups":["/infra/domains/SlackApplicationDomain/groups/slack-
base"],
                           "services":[
                              "/infra/services/HTTPS",
                              "/infra/service/HTTP"
                           ],
                           "action":"ALLOW"
                        },                                    460
                        {                                     /
                           "_revision":0,
                           "resource_type":"CommunicationEntry",
                           "id":"slack-call",
                           "source_groups":["/infra/domains/SlackApplicationDomain/groups/slack-call"],
                           "destination_groups":["/infra/domains/SlackApplicationDomain/groups/slack-
base","ANY"],
                           "services":[
                              "/infra/services/HTTPS"
                           ],
                           "action":"ALLOW"
                        },                                    465
                        {                                     /
                           "_revision":0,
                           "resource_type":"CommunicationEntry",
                           "id":"slack-editing",
                           "source_groups":["/infra/domains/SlackApplicationDomain/groups/slack-editing"],
                           "destination_groups":["/infra/domains/SlackApplicationDomain/groups/slack-
base"],
                           "services":[
                              "/infra/services/HTTPS"
                           ],
                           "action":"ALLOW"
                        },
```

*Figure 4D*

```
                                                                    470
                                 {                                 /
                                   "_revision":0,
                                   "resource_type":"CommunicationEntry",
                                   "id":"slack-file-sharing",
                                   "source_groups":["/infra/domains/SlackApplicationDomain/groups/slack-file-
sharing"],
                                   "destination_groups":["/infra/domains/SlackApplicationDomain/groups/slack-
base"],
                                   "services":[
                                      "/infra/services/HTTPS"
                                   ],
                                   "action":"ALLOW"
                                 }                                  475
                                 ,{                                /
                                   "_revision":0,
                                   "resource_type":"CommunicationEntry",
                                   "id":"slack-downloading",
                                   "source_groups":["/infra/domains/SlackApplicationDomain/groups/slack-
downloading"],
                                   "destination_groups":["/infra/domains/SlackApplicationDomain/groups/slack-
base"],
                                   "services":[
                                      "/infra/services/HTTPS"
                                   ],
                                   "action":"ALLOW"
                                 },                                 480
                                 {                                 /
                                   "_revision":0,
                                   "resource_type":"CommunicationEntry",
                                   "id":"slack-base",
                                   "source_groups":["/infra/domains/SlackApplicationDomain/groups/slack-base"],
                                   "destination_groups":["/infra/domains/SlackApplicationDomain/groups/
activedirectory"],
                                   "services":[
                                      "/infra/services/ldap",
                                   ],
                                   "action":"ALLOW"
                                 }
                               ]
                             }
                           }
                         ]
                       }
                     }
                   ],
                   "connectivity_strategy":"WHITELIST"
                 }
               }
             }
```

*Figure 4E*

TEMPLATE DRIVEN APPROACH TO DEPLOY A MULTI-SEGMENTED APPLICATION IN AN SDDC

CLAIM OF BENEFIT TO PRIOR APPLICATIONS

The present Application is a continuation application of U.S. patent application Ser. No. 16/112,408, filed Aug. 24, 2018, now published as U.S. Patent Publication 2020/0065166. U.S. patent application Ser. No. 16/112,408, now published as U.S. Patent Publication 2020/0065166, is incorporated herein by reference.

BACKGROUND

In enterprise data centers, firewalls have been the essence for the networking and security of the applications that run on them. It started with Access Control Lists (ACLs), which provided rules that are applied to port numbers or IP addresses that are available on a host or other layer 3, each with a list of hosts and/or networks permitted to use the service. After ACLs, macro-segmentation came along to provide IP based enforcement for every application that runs on a host. This enabled granular level controls for enterprise administrators to protect their workloads based on VLANs.

With network virtualization, micro-segmentation has turned around the networking and security space by providing the ability to enforce distributed firewall rules across hosts in the datacenter based on L4-L7 network services and attributes. There are new firewalls which have the capability to perform deep packet introspection in the transport layer and include Web application filtering, Verb based firewalls and URL filtering.

FIG. 1 shows the current workflow for specifying firewall controls for micro-segmented applications. As shown, the administrator has to first define (at 105) an intent as to which application they would like to secure. Based on the intent, the administrator has to create (at 110) domains and groups to define the boundaries of each component of the application. Once the groups are created, the administrator then defines (at 115) how these components can communicate with each other based on a communication profile.

After the profile and groups are created, the resulting policy is published at 120 to the software defined datacenter (SDDC) network managers 150. After publishing the policy, the administrator has to then login to the network manager for every instance of the datacenter the manager controls and create (at 125) the networking and security groups based on the grouping criteria specified in the creation of the domains and groups. The criteria could be based on logical switch ports, tags, or VM/container names.

The administrator then has to manually manage (130) the workload VMs/containers by applying the corresponding tags so that they match the criteria during the creation of the network and security groups at 125. When the tag matches the criteria, the firewall rule defined in the communication profile is then applied (at 135) to respective VMs.

This approach has several shortcomings. For instance, the management of grouping criteria (Tags, VM name etc.) is manual and cumbersome. This is particularly problematic as this management has to be repeated across multiple environments (e.g., development, staging and production). In addition, discovery and classification of the applications is an administrative overhead and is often error prone. This approach is also not scalable for dynamic workload (e.g. Container) environments when the entities being protected are ephemeral in nature

BRIEF SUMMARY

Some embodiments provide a simplified mechanism to deploy and control a multi-segmented application by using application-based manifests that express how application segments of the multi-segment application are to be defined or modified, and how the communication profiles between these segments. In some embodiments, these manifests are application specific. Also, in some embodiments, deployment managers in a software defined datacenter (SDDC) provide these manifests as templates to administrators, who can use these templates to express their intent when they are deploying multi-segment applications in the datacenter. Application-based manifests can also be used to control previously deployed multi-segmented applications in the SDDC. Using such manifests would enable the administrators to be able to manage fine grained micro-segmentation rules based on endpoint and network attributes.

Multi-segment application is an application that includes multiple application segments. In some embodiments, each of one or more application segments is a standalone application executing in its own memory space that is disjoint from the memory spaces of any other application segment of the multi-segment application. In some embodiments, different application segments of a multi-segment application are implemented by different machines (e.g., different VMs or containers).

In some embodiments, an application manifest includes a syntactical representation of the multi-segmented application, which may be defined after implementing the manifest, or it may have been defined earlier. An application manifest in some embodiments is a hierarchical API that includes two or more commands that define or modify (1) one or more application segments, and (2) one or more policies associated with them. The application manifest is a hierarchical API as different commands can be nested under other commands, e.g., the definition of one group of applications can include the definition of specific machines (e.g., specific VMs) to implement specific applications in the group. In some embodiments, the application manifests are provided to administrators as predefined templates that encapsulate well-known applications and their dependencies, as well as an ability to model the applications based on the administrator's requirements.

In some embodiments, the manifest is defined in a declarative language. In some embodiments, a manifest-processing framework in the SDDC parses the manifest into several commands that (1) direct compute managers in the SDDC to deploy and configure the application segments of the multi-segment application defined in the manifest, and (2) direct the network managers in the SDDC to define and deploy the network forwarding and service rules for implementing the communication profiles between the application segments as specified by the manifest and between application segments and other applications.

In some embodiments, the application segments are deployed as VMs or containers executing on host computers, and/or as standalone computers, in the SDDC. Similarly, the network forwarding and service rules in some embodiments are processed by software forwarding elements (e.g., software switches and routers) and software middlebox service VMs (e.g., service containers and/or services modules executing on the host computers in the SDDC). These forwarding and/or service rules are also configured in some embodiments on hardware forwarding elements (e.g., top-of-rack switches), standalone hardware or software gateways, and/or standalone middlebox appliances in the SDDC.

Some embodiments of the invention provide a method for deploying multi-segmented application in an SDDC. The method initially receives a hierarchical API command that, in a declarative format, specifies several operation requests to define several application segments of the multi-segmented application. The method parses the API command to identify the application segments. Based on the parsed API command, the method deploys several software defined (SD) resources that are needed to deploy several application segments, as well as forwarding and servicing operations between these segments.

The deployment process that the method uses in some embodiments that ensures that any first SD resource on which a second SD resource depends is deployed before the second resource. In some embodiments, a second SD resource depends on a first SD resource when the second SD resource is a child of the first SD resource. Alternatively, or conjunctively, a second SD resource can also depend on a first SD resource in some embodiments when the second SD resource has some operational dependency on the first SD resource.

In some embodiments, the method parses the API command by identifying several sets of SD resources, with each set having one or more SD resources at one resource level. The deployment in some embodiments deploys the identified SD resource sets at higher resource levels before deploying SD resources at lower resource levels. Examples of SD resources that can be specified in the hierarchical API command include SD compute elements (e.g., VMs or containers) to implement the application segments, SD forwarding elements (e.g., managed software switches and routers, logical switches and routers implemented by the managed software switches and routers, etc.) to implement the forwarding rules for forwarding data messages associated with the application segments, and SD service middlebox modules (e.g., service VMs or modules that perform middlebox service operations such as firewall operations, load balancing operations, network address translation operations, encryption operations, intrusion detection operations, intrusion prevention operations, etc.) to enforce service rules for performing services on data messages associated with the application segments.

In some embodiments, an API processing system processes the API command. This command can include a set of parameters to update an earlier deployed SD resource. When this is the case, the API processing system deploys a multi-segmented application by using a set of parameters specified in the parsed API command to update the SD resource deployed earlier for the multi-segmented application. In some such cases, the API command includes a set of parameters that define a new SD resource. In such cases, the API processing system deploys the SD resource by deploying the SD resource based on the set of parameters specified in the parsed API command.

In some embodiments, the hierarchical API command is processed as one atomic unit. Accordingly, the API processing system determines whether the identified SD resources in the hierarchical API command are deployable. If so, the API processing system sends a confirmation that the API command has been successfully processed to a source that produced the hierarchical API command. On the other hand, when one or more SD resources in the API command are not deployable, the API processing system sends a message that the API command has not been successfully processed to the source that produced the hierarchical API command.

Some embodiments pave the way for the next generation of micro-segmentation by tying the context from the data compute endpoint to the network. The endpoint based context could be related to user identity, as well as application specific attributes such as file hash, publisher info, licensing, and process information. In some embodiments, the contextual information is used by application-based firewalls that are deployed in a distributer manned in the SDDC (e.g., through a virtualized network apparatus). One of the biggest challenges of commoditizing an application-based firewall is the consumption model for such a complex firewall, because there can be thousands of processes that might be running inside an endpoint and millions in a datacenter. However, by using application manifests, some embodiments provide a novel approach to allow administrators to manage the very difficult task of creating fine grained context-based rules and managing these rules.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

FIG. 4 illustrates an example of an application manifest that defines a multi-segmented application called Slack.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel application-based manifest, which provides a simplified mechanism to deploy and control a multi-segment application and to define the communication profiles between the segments of the multi-segment application. A multi-segment application is an application that includes multiple application segments. In some embodiments, each application segment can be a standalone application executing in its own memory space that is disjoint from the memory spaces of any other application segment of the multi-segment application. In some embodiments, different application segments of a multi-segment application are implemented by different machines (e.g., different VMs or containers).

In some embodiments, deployment managers in a software defined datacenter (SDDC) provide these manifests as templates to administrators. The administrators, in turn, can use these templates to express their intent when they are deploying multi-segment applications in the datacenter. Application-based manifests can also be used to control previously deployed multi-segmented applications in the SDDC. Using such manifests would enable the administrators to be able to manage fine grained micro-segmentation rules based on endpoint and network attributes.

In this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Figure 1:
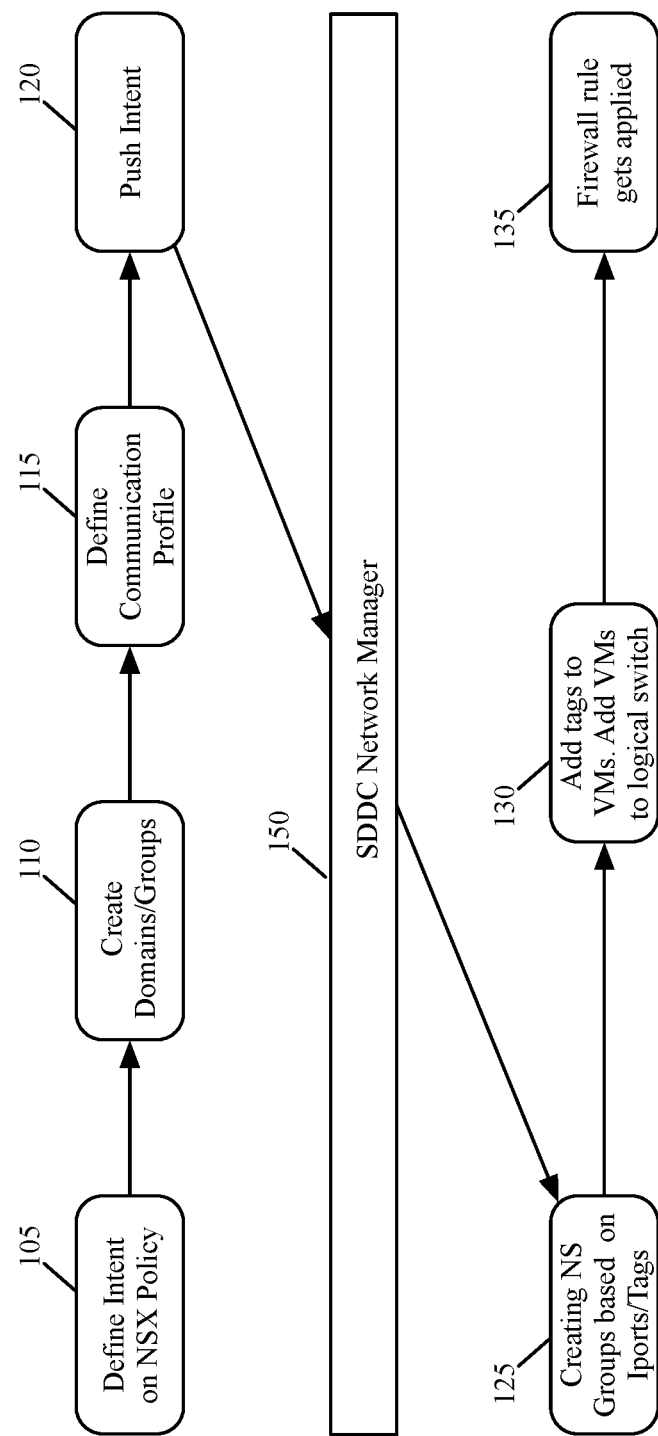
FIG. 1 shows the current workflow for specifying firewall controls for micro-segmented applications.
Figure 2:
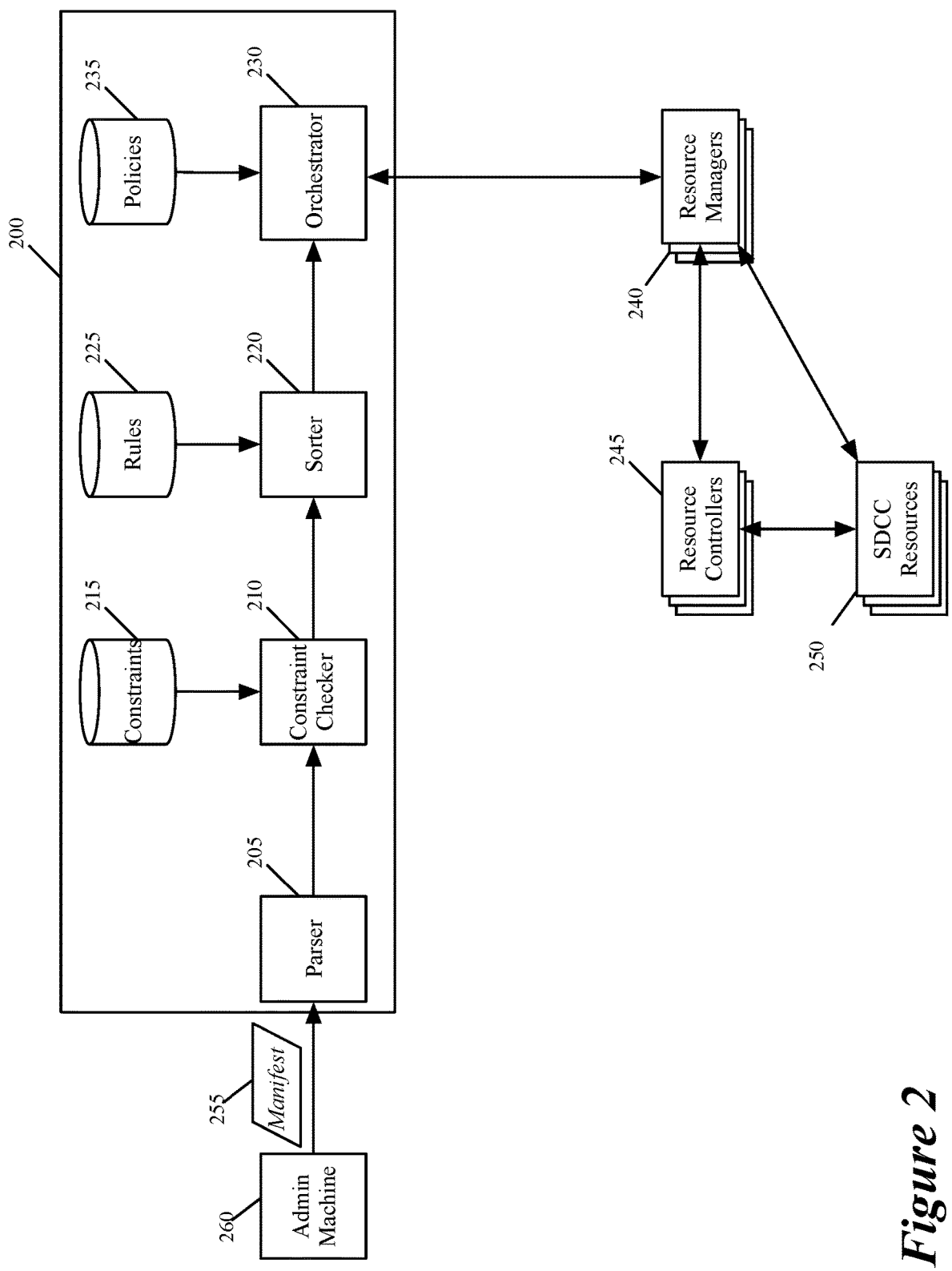
FIG. 2 illustrates a manifest-processing framework that processes application manifests received from tenant administrators in an SDDC.

FIG. 2 illustrates a manifest-processing framework 200 that processes application manifests received from tenant administrators in an SDDC. Based on this processing, the framework 200 interacts with compute and network managers in the SDDC to deploy a multi-segmented application and to configure the forwarding and service elements in the SDDC to set up the desired communication rules between the segments of this application and between these segments and other applications and devices inside and outside of the SDDC. In some embodiments, application manifests can also include requests for adjusting previously deployed multi-segmented applications and/or previously configured communication profiles for the previously deployed segments.

Figure 3:
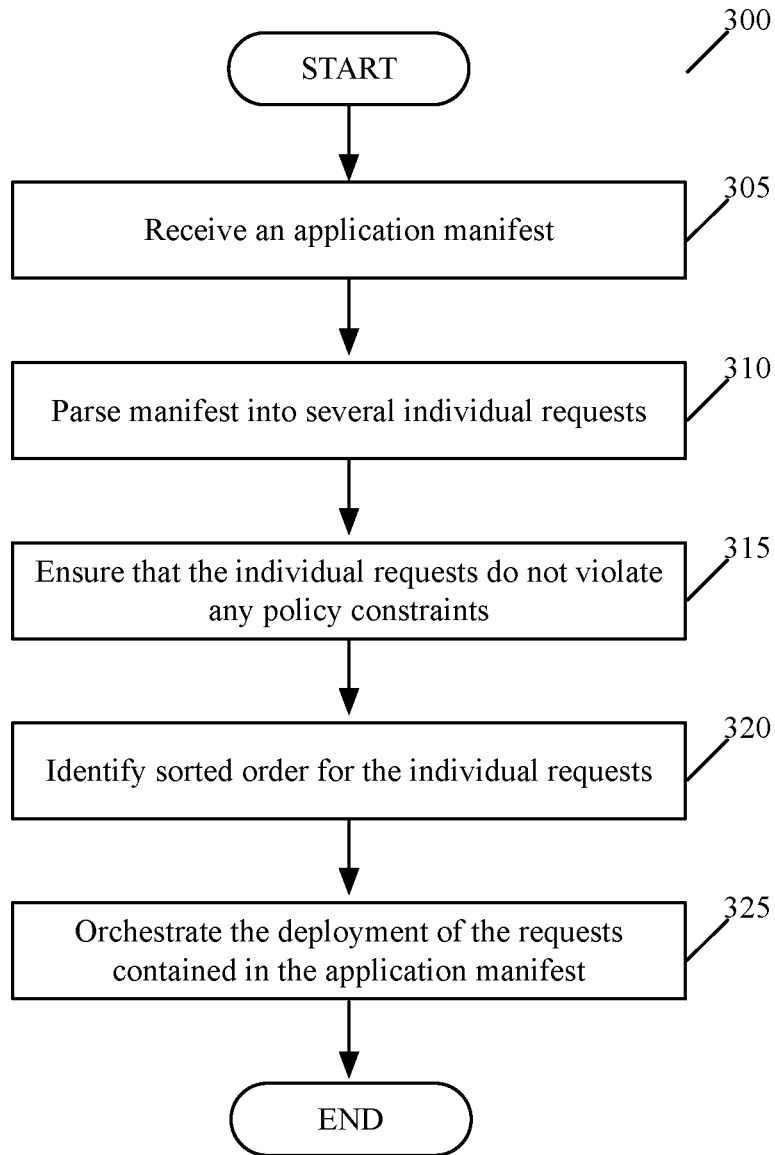
FIG. 3 presents a process that illustrates the operation of the components of the manifest-processing framework.

As shown, the manifest framework includes a parser 205, a constraint checker 210, a sorter 220, an orchestrator 230, and several rule and policy storages 215, 225 and 235. The operations of these components will be described by reference to FIG. 3, which illustrates a process 300 that these components perform for an application manifest. As shown, the process 300 starts when the manifest-processing framework 200 receives (at 305) an application manifest from an administrator's machine 260 (e.g., from a VM, container, or standalone computer used by the administrator to specify the application manifest). As mentioned above and further described below, the administrator in some embodiments can use an application manifest template provided by the manifest framework to specify the manifest 255.

In some embodiments, the application manifest 255 includes a syntactical representation of a multi-segmented application. An application manifest in some embodiments is a hierarchical API that includes two or more commands that define or modify (1) one or more application segments, and (2) one or more communication profiles between each application segment and another application segment or another application/machine inside or outside of the SDDC.

The application manifest is a hierarchical API, as different commands can be nested under other commands, e.g., a domain definition can include an application-segment group definition which in turn can include one or more definitions of one or more machines (e.g., specific VMs or containers) to implement an application segment. In some embodiments, the manifest is defined in a declarative language. For instance, the manifest is written in a Javascript® Object notation (JSON) format in some embodiments, but in other embodiments it can be expressed in other hierarchical formats such as the XML (Extensible Markup Language) format.

After receiving an application manifest 255, the parser 205 of the framework 200 identifies (at 310) several different requests (commands) contained in the manifest. For instance, for a typical three-tier application, the manifest can specify the deployment of a webserver, an application server, and a database server. In such a situation, the parser would parse the manifest into three sets of one or more commands, with each set associated with the deployment of one of the tiers (e.g., the deployment of the webserver, appserver, or database server). In some embodiments, the parser generates an input API tree from the manifest. The input API tree represents the parent child relationship between the different portions of the manifest.

After the parser breaks the manifest into several individual requests, the constraint checker 210 determines (at 315) whether any of the individual requests violate policy constraints stored in its constraint storage 215. If so, the framework returns an error to the administrator. Otherwise, the sorter 220 identifies (at 320) a sorted order for implementing these requests. To identify this sorted order, the sorter in some embodiments constructs a type specific map that identifies each SD resource identified in the manifest according to its type. To do this, the sorter in some embodiments performs a breadth-first traversal of the input API tree constructed from the manifest by the parser, classifies the input into different buckets based on the resource types, and stores the classified input in the type specific map.

Each key in the type specific map is a resource type, and the value for each key is a list of all resources of the specific type in the input API tree. Each node element is stored along with its parent. In sum, the input API tree is classified based on resource types, e.g., all domains in one bucket, all groups in another and so on. After generating the type specific map, the sorter defines an execution order for persisting the SD resources in the input API tree. In some embodiments, the execution order is a predefined ordered list of resource types. This list governs the order in which resources in the input tree should be persisted. If a new type is introduced in the system, the execution order is dynamically updated to include the order for the new element. For example, a sample execution order in some embodiment would be (1) Domain, (2) Group, and (3) Communication Map. This means domains should be created first, then the groups, and then communication maps.

Next, the sorter uses a service provider registry to persist the SD resources in the constructed API tree. The service provider registry is a map of resource types to callback handlers. The callback handlers are registered for each type in the system. The responsibility of a callback handler is to persist the type for which it is registered. As further described below, the callback handlers are implemented by deployment plugins in some embodiments. A deployment plugin is a module that plugs into an API processing system to handle the persistence of changes requested by received APIs and the deployment of the persisted changes.

Once the sorter identifies the invocation order and, based on this order, invokes the call back handlers to persist the deployment data to one or more configuration databases, the orchestrator 230 interacts (at 325) with one or more network, compute and/or service managers 240 to deploy the SD resources 250 based on the configuration data that has been persisted to the configuration databases. In some embodiments, the orchestrator 230 is implemented by the deployment plugins that also implemented the callback handlers for persisting the data to the configuration databases.

Also, in some embodiments, the SDDC resource managers 240 use one or more SDDC resource controllers 245 to deploy the multi-segmented application and its associated communication profiles on the SDDC resources 250. Examples of such resources include host computers, VMs, containers, software and hardware forwarding elements, software and hardware middlebox service elements, etc. The resource managers and controllers 240 and 245 include (1) compute managers and controllers that deploy and configure the application segments of the multi-segment application defined in the manifest, and (2) network managers and controllers that define and deploy the network forwarding and service rules for implementing the communication profiles for the application segments as specified by the manifest.

In some embodiments, the application segments are deployed as VMs or containers executing on host computers, and/or as standalone computers, in the SDDC. Similarly, the network forwarding and service rules in some embodiments are processed by software forwarding elements (e.g., software switches and routers) and software middlebox service VMs, service containers and/or services modules executing on the host computers in the SDDC. These forwarding and/or service rules are also configured in some embodiments on hardware forwarding elements (e.g., top-of-rack switches), standalone hardware or software gateways, and/or standalone middlebox appliances in the SDDC.

FIG. 4 illustrates an example of an application manifest that defines a multi-segmented application called Slack. The application manifest in this example is a hierarchical API template 400 that can be used to define an actual application manifest to send to the manifest-processing framework. Such a template provides a mechanism to specify a common set of requests that are often invoked in sequence in order to deploy a multi-segmented application. The template API allows the administrator to deploy the common set of requests without having to define the series of APIs from scratch.

To specify an actual multi-segment application manifest off of a manifest template 400, an administrator in some embodiments just needs to modify a limited number of fields, called placeholder fields, in a copy of the template that becomes the manifest. From this perspective, a template API is a set of one or more requests (with respect to one or more resources) with blank fields or placeholders. Examples of placeholder application name, application identifier (Ap-p_ID), process name, process hash, user identifier, or any other key value pairs used in the multi-segment application template. In some embodiments, the administrator can also modify other components (e.g., add segments, add or delete communication rules, modify communication rule parameters, etc.) of a copy of template that becomes the actual manifest.

Figure 5:
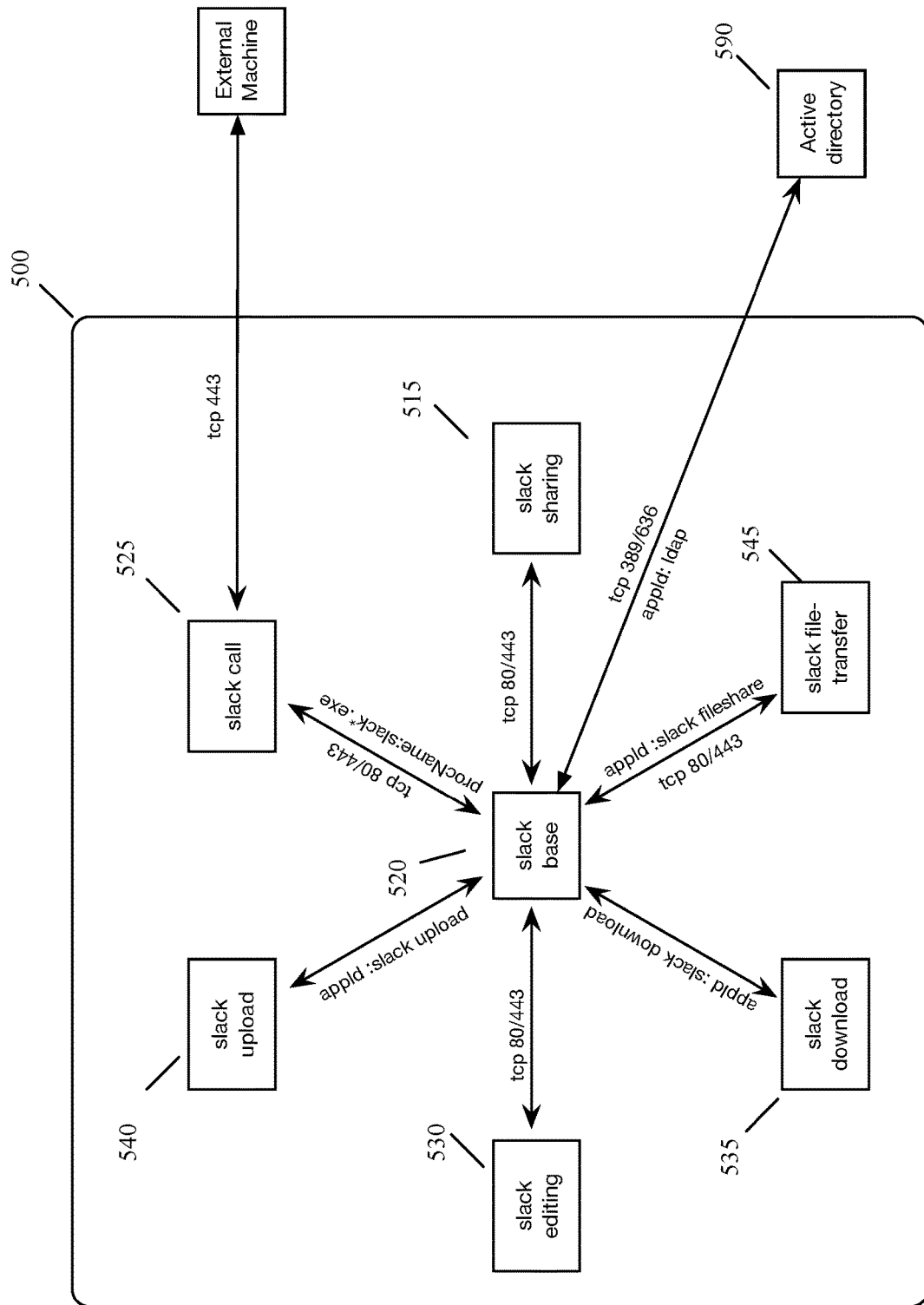
FIG. 5 illustrates an example of Slack.

In some embodiments, the API template is a managed resource. It is represented by a list of placeholders and a body which is the API object. The API template 400 of FIG. 4 is for deploying a Slack application. FIG. 5 illustrates an exemplary deployment of the Slack application 500. This application has a data model that is pictorially illustrated in FIG. 6. Both the application 500 and the data model 600 will be further described below in order to further describe the portions of the application manifest 400.

The application manifest 400 is in a hierarchical JSON format, which is equivalent to a tree format. Each node of the tree corresponds to an SDDC resource and has a field that describes the resource type for that node. Each node has a special property that holds all the children for the node depicting the parent-child relationship. Child nodes can in turn have multiple children and this can go to any depth. Thus, each node can be a parent and a child at the same time (similar to a non-leaf node in a tree).

In FIG. 4, each node has a property "resource type" that describes the node's type. Example types in some embodiments include Infra, Tenant, Domain, Group, CommunicationMap, CommunicationEntry, etc. These are all different types of resources in a datacenter. A node can also have a property "Children" that holds all the children of the node. For instance, in FIG. 4, the node of type Domain 410 is a child of type Infra 405 and has eight children 415-450 of two different types which are "Group" and "CommunicationMap." In some embodiments, Tenant refers to a tenant in a multi-tenant SDDC, Domain is the workload under a tenant, CommunicationMap are security policies, and CommunicationEntry are the rules under a security policy.

In some embodiments, each SD resource can be identified with a unique path from the root with all taxonomical parents included in the path. For example, a /vmware specifies all resources associated with a tenant VMware®. A path /vmware/domains/Outlook specifies all Outlook workloads for the tenant VMware®. A path /vmware/domains/Outlook/communication-maps/web-profile specifies the web-profile of the Outlook workloads of the tenant VMware®. A path
/vmware/domains/Outlook/communicationmaps/web-profile/communication-entries/open-browser-access
specifies the open browser access of Outlook workload of the tenant VMware®. More generally, the format for the path for a security policy can be specified as: /<tenant-name>/domains/<workload-name>/communication-maps/<security-policy-name>/communication-entries/<rule-name>.

As shown in FIG. 4, this manifest template 400 includes a template header 401 that provides a name 402 and a description 403 of the template along with a placeholder list 404. The manifest template 400 also includes eleven requests 405-480. Request 405 is to create a construct called Infra. This construct has eight children as defined by requests 405-450. The request 410 defines a Domain called slack_app.

Requests 415-445 define seven application segments of the slack_app multi-segment application. These seven segments are illustrated in FIG. 5. As shown, these seven segments include slack sharing 515 (defined by request 415), slack base 520 (defined by request 420), slack call 525 (defined by request 425), slack editing 530 (defined by request 430), slack downloading 535 (defined by request 435), slack uploading 540 (defined by request 440), and slack file-transfer 545 (defined by request 445). Each request 415-445 for each segment specifies that the segment is to be implemented by a VM that is tagged with a key that is set equal to the name (identifier) for that segment.

Figure 6:
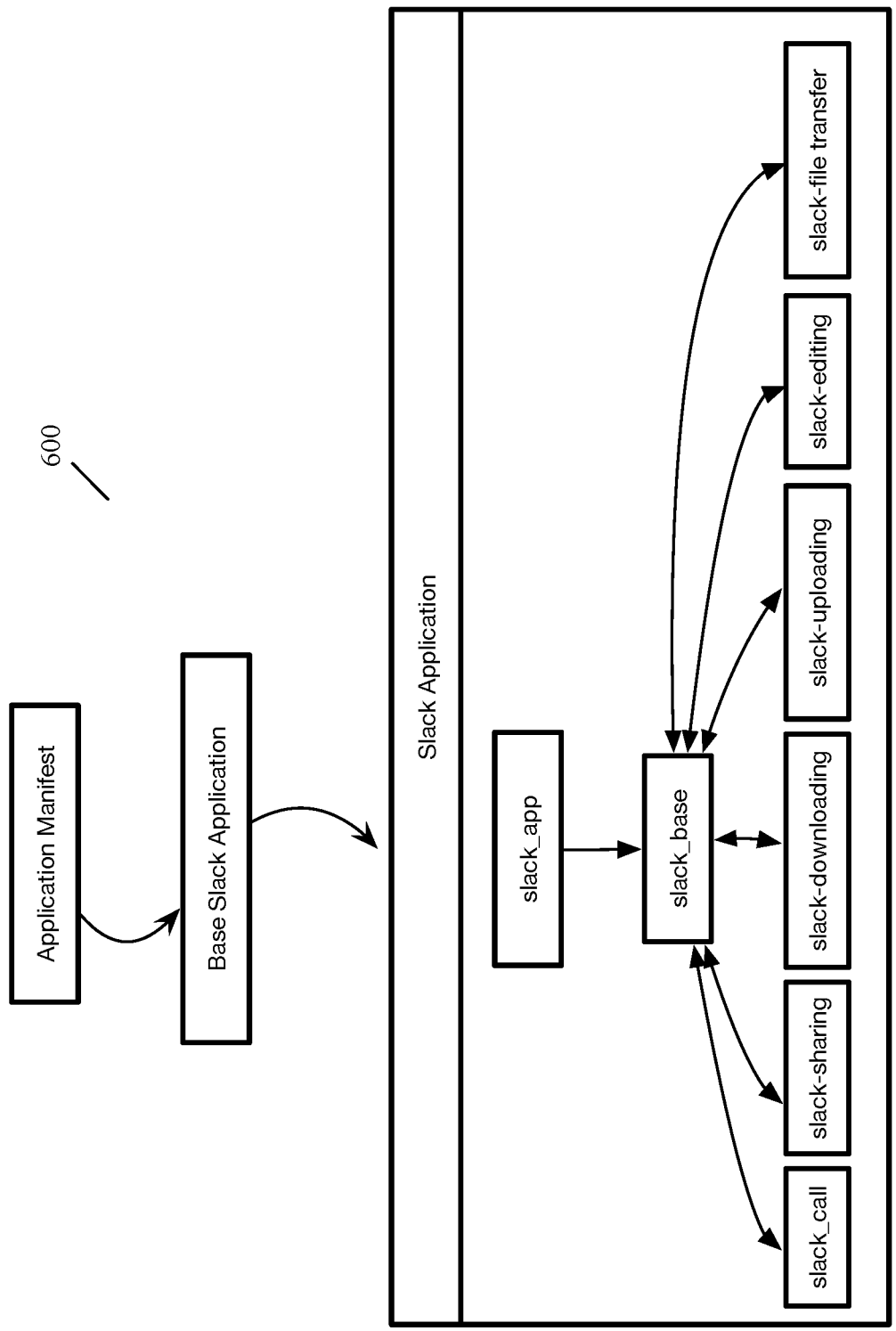
FIG. 6 illustrates the data model of the application illustrated in FIG. 5.

FIGS. 5 and 6 show the communications between these segments go through slack base 520. As such, the request 450 defines the communication profile (i.e., Communication Map) between these segments in terms of six communication rules (i.e., Communication Entries) regarding data message exchange between the slack base 520 and each of the other segments 515 and 525-545. In some embodiments, these six communication rules are implemented by firewall rules in the dataplane. FIG. 5 also illustrates that in some embodiments the communication rules (e.g., the firewall rules) can be based on any number of different contextual attributes, such as appID, process name, etc.

As shown, each communication entry is expressed in terms of the source of a data message (e.g., a source group), a destination of a data message (e.g., a destination group), an action specifying whether the communication is allowed or rejected, and a set of services, ports and/or protocols that are used by the data message. The Communication Map also defines a rule 480 (i.e., a communication entry) that specifies how the slack base may communication with an active directory service 590, shown in FIG. 5. In some embodiments, these communication entries 455-480 are be translated into firewall rules by the manifest-processing framework for controlling communication between the different segments of Slack and between other machines (inside or outside of the SDDC) and these segments.

In some embodiments, a template can be managed through GET, PATCH, DELETE, and POST commands. For instance, in some embodiments, a GET/policy/templates returns a list of template identifiers in the database. A GET /policy/templates/<template-id> in some embodiments returns the template for a specific template identifier. Also, in some embodiments, a PATCH /policy/templates followed by a template JSON definition creates a new template. A DELETE /policy/templates/<template-id> in some embodiments deletes a template given a specific template identifier.

A POST /policy/templates/<template-id>?action=deploy is specified in some embodiments to define and invoke a hierarchical API based on a template API. This command deploys a template given a specific template identifier <template-id>. Arguments that provide the values of the placeholders in the template will be passed in the body of the POST request. In response to the POST command along with the placeholder arguments, a template manager of the manifest-processing framework in some embodiments fetches the identified template, applies arguments that represent the placeholder values in order to define the hierarchical API, and then creates one or more request objects to identify each requested operation in the hierarchical API. Such a template manager will be further described below.

In sum, the manifest template 400 specifies the set of processes that define the multi-segment application and also the set of recommended communication profiles. These definitions can be modified by the administrator based on the administrator's requirements. In other words, the administrator has the option to use this verbatim in the environment or make modifications as deemed necessary in their data center. This sample application manifest for Slack can be published as a standard across the industry for easier deployment and micro-segmentation of this application.

Figure 7:
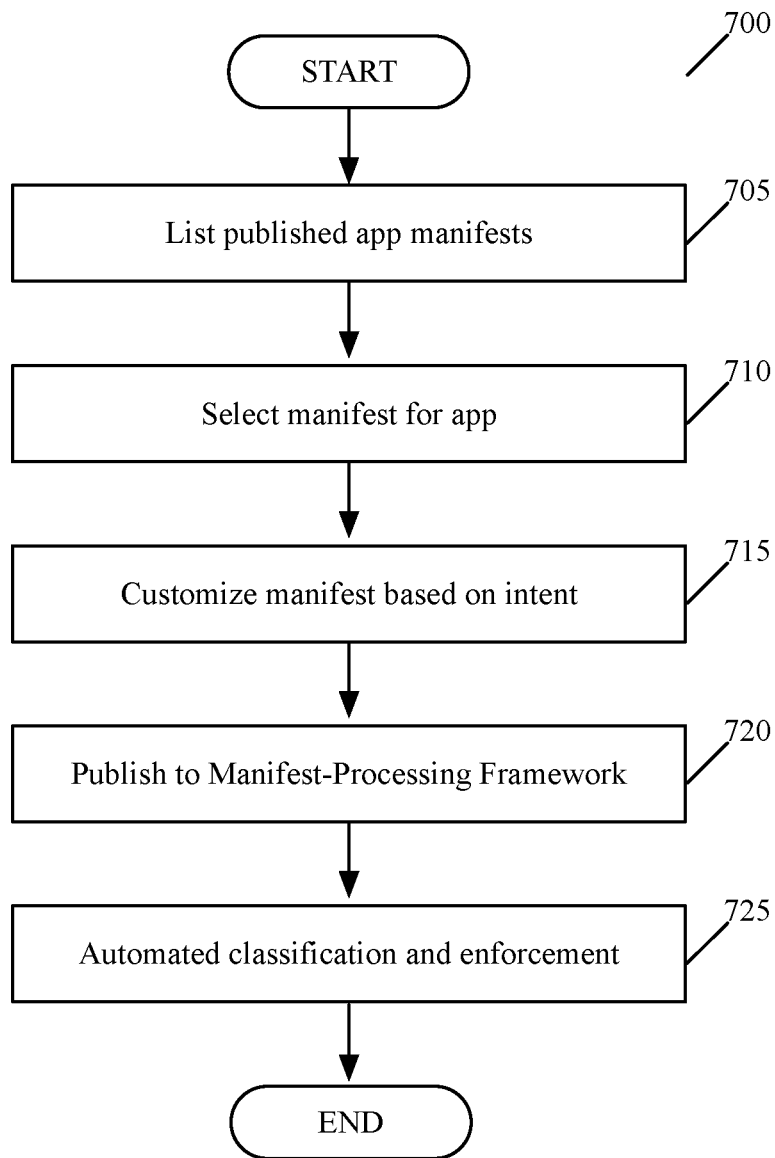
FIG. 7 illustrates a process that represents an exemplary flow for defining and deploying a multi-segmented application based on a manifest template.

FIG. 7 illustrates a process 700 that represents an exemplary flow for defining and deploying a multi-segmented application based on a manifest template. As shown, the process 700 initially provides (at 705) a list of application manifest templates. The manifest templates in some embodiments are templates for the most commonly used multi-segmented applications. The manifest templates in some embodiments are open sourced and community driven so that there is more exposure and accuracy for these applications.

Next, at 710, an administrator selects a manifest template from the list of provided manifest templates. The selected template is for the multi-segment application that the administrator wants to deploy. At 715, the administrator verifies the manifest based on his intent. The selected manifest shows the compute, networking, and security intent using the default configuration as defined by the publisher of the template. The administrator has the option to accept the default configuration or modify it to match with the desired intent.

At 720, the administrator submits the manifest to the manifest-processing framework for processing and deployment. Once the manifest is published to the framework, the framework deploys (at 725) the compute, network, and/or service resources specified in the manifest. After 725, the process 700 ends.

Figure 8:
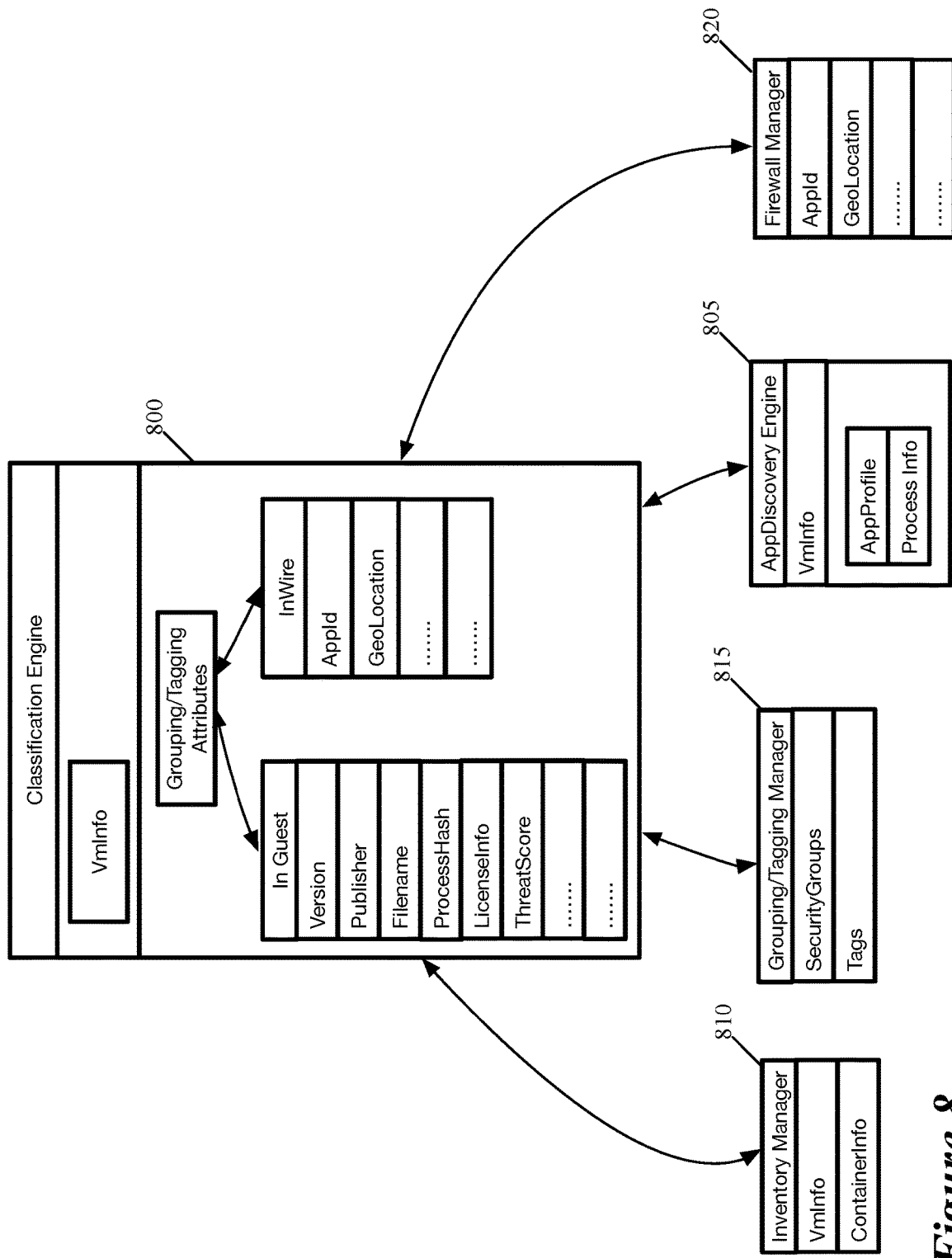
FIG. 8 illustrates the architecture of this new classification engine for some embodiments.

In some embodiments, the framework uses a new classification engine, which is a middlebox service the collects different types of contextual attributes from the deployment environment (such as those used by existing or new workloads) so that these attributes can be used by administrators in defining the communication entries in the manifest. FIG. 8 illustrates the architecture of this new classification engine for some embodiments.

Applications running on the VMs are not ephemeral by nature. Once an administrator installs an application, these applications typically run for a long time. This applies to VMs and bare metal servers typically. In some embodiments, context engines running on hypervisors executing on host computers periodically send to the SDDC management plane lists of running processes on their guest VMs. The Application discovery engine 805 receives this information and provides a visualization about the application information and the associated virtual machine.

In some embodiments, this information is not polled continuously, and the process is not automated. Accordingly, the new classification vertical on management plane in some embodiments performs a periodic synchronization operation internally to detect the list of running/installed processes on the VMs and tag them based on the process information. The inventory vertical 810 gets the list of VMs in the system and creates a security group internally and enables application discovery for these VMs. Once the list of applications/ processes running on the VMs are identified, the VMs are tagged with the process. The grouping/tagging manager 815 collects the security groups and other tagging data for the classification engine 800, while the firewall manager 820 collects the contextual data from and for the deployed firewalls. Based on the collected tags, the intent from the policy created at the application level determines the security groups and the communication profile for these processes.

Figure 9:
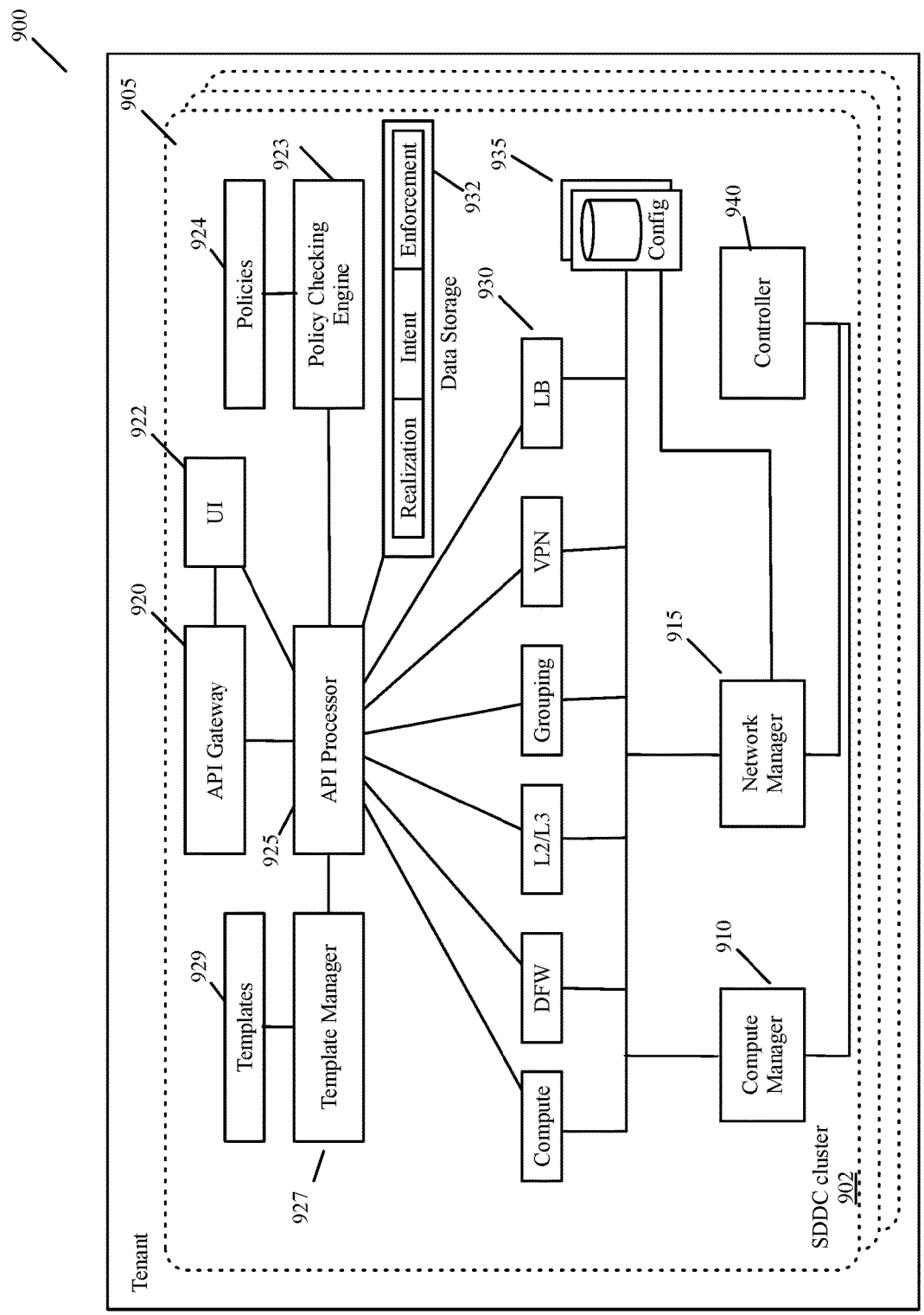
FIG. 9 illustrates an example of the API processing system of some embodiments of the invention.

FIG. 9 illustrates an example of the API processing system 900 of some embodiments of the invention. This API processing system 900 implements the manifest-processing framework 200 of some embodiments. In this system, each tenant can create an SDDC cluster 902 that includes one or more SDDC instances 905, which can be considered to be separate environments. As shown, each SDDC instance 905 in some embodiments includes an API gateway 920, an API processor 925, a compute manager 910, a network manager 915, a controller 940, a template manager 927, a policy checker 923, a configuration data storage 935, and several deployment plugins 930.

In some embodiments, two or more of these components execute on two or more machines (e.g., VMs, containers, standalone servers, etc.) in one or more datacenters and communicate with each other through a network. In these or other embodiments, each SDDC instance includes multiple instances of each of these components for distributing the load and for high availability.

The compute manager 910 deploys and manages workload machines (e.g., workload VMs or containers). The network manager 915 on the other hand deploys network resources (e.g., software switches and routers) and middlebox service resources (e.g., service VMs and modules) in a datacenter. In some embodiments, the compute and network managers 910 and 915 use one or more controllers 940 to distribute the configuration data that is stored in one or more configuration data storages 935 to host computers, forwarding elements (e.g., software switches and routers executing on host computers, or standalone switches and routers), service machines (e.g., service VMs, service containers, other service modules, and standalone service appliances), and other resources in the SDDC.

The API gateway 920 redirects all API commands to the API service module 925, or to the UI manager 922 in some cases, based on URL patterns. The UI manager 922 processes API commands that are received through a graphical user interface and directs these commands to the API processor 925. The API processor 925 performs the processes illustrated in FIGS. 2 and 3 to ensure that the different requests that are part of a received application manifest are persisted to the configuration data storage(s) 935 and deployed in the correct order. The API processor 925 owns the user's desired state that it stores in its data storage 932. In some embodiments, the API processor 925 runs as a VM or container.

As shown, the API processor 925 in some embodiments uses the template manager 927, which has access to several manifest templates 929 that specify multi-segment application configurations for the SDDC resources. Through the template manager 927, users can select and modify a template (e.g., through API commands) to produce a complete manifest. Based on this completed manifest, the API processor 925 can then deploy, or update a previously deployed, set of SDDC resource to deploy or adjust a previously deployed multi-segment application.

To deploy a resource, or update a previously deployed resource, based on a request in a received manifest or a manifest completed through the invocation of a manifest template with the required input, the API processor 925 in some embodiments parses the manifest into one or more requests and uses the policy checking engine 923 to validate each request (i.e., to specify whether each request satisfies the constraints specified in the policies that are stored in the policy storage 924 and that are applicable to the resources referred to in the request).

In some embodiments, each policy in the policy storage 924 includes (1) a target that specifies a set of one or more datacenter resources to which the policy applies, and (2) an expression that specifies a constraint on operations on the specified resource set. The policies are expressed in a declarative format in some embodiments. Thus, for each request in a manifest, the policy engine compares a set of attributes of the selected request's resource with a policy's target to determine whether the policy is applicable to the resource. After identifying one applicable policy, the policy checking engine determines whether the identified policy's expression specifies a constraint that requires the selected request to be rejected or allowed.

Through the deployment plugins 930, the API processor 925 persists the SD resource data in the API calls in the configuration database 935. The deployment plugins 930 run as VMs or containers in some embodiments. Each plugin 930 is responsible for deploying one or more SD resource types. Examples of such types include data compute nodes (e.g., compute machines such as VMs or containers), distributed firewall rules, edge firewall rules, L2 and L3 forwarding elements (software switches and routers), security groups, VPN services, DHCP services, DNS services, load balancing services, etc.

To deploy these services, the plugins 930 interact with the compute manager 910 and the network manager 915, which, in turn, interact with one or more controllers 940. Through these managers and controllers, the plugins 930 distribute configuration data from the persistent database 935 to host computers and standalone network/service devices in an SDDC in order to direct these computers and devices to deploy the desired SD resources.

In some embodiments, there is one desired state and orchestration service (i.e., API processing module) per SDDC instance. This is a highly available service that is deployed in some embodiments in the form of a container or a VM. This service accepts user's intent and performs orchestration across different services. This service also owns the details of the enforcement points (compute and network managers) to which the policies need to be pushed down.

The deployment plugins 930 provide the realization of the intent. As mentioned above, each of these plugins in some embodiments is deployed as a separate service running in a separate container or VM. In some embodiments, some services are packaged together in a single container, but run as separate services in terms of design and communication. Since the orchestration is performed by the desired state service, each of the plugin services in some embodiments exposes a set of REST API endpoints that would be invoked. Also, the desired state service in some embodiments serves as the common service that returns the state of the realized resources across different services. This is the case even though in some embodiments the realized state data is updated in the data store by the plugin services.

Thus, execution of manifest results in creation of desired state in one go. If the system is able to validate and persist whole of intent, a notification is sent (e.g., an http status code 200 OK is returned) to the source of the manifest. After the intent is created, notifications are generated. These notifications are consumed asynchronously by deployment plugins. The deployment plugins then take care of realizing the intent. Status of realization can be queried from the system using status APIs The API processing system 900 in some embodiments provides users with the ability to query the intent in hierarchical fashion. For instance, in some embodiments, the system provides a GET API that facilitates the reading of entire intent in one go. A special flag is passed in URL parameter to request GET in hierarchical fashion. When the parameter is not passed, the GET in some embodiment would work as normal GET and a single resource is returned. Hierarchical GET in some embodiments can work on the entire tree or the parts of the tree, i.e. it can specify the node from which the hierarchy is to be retrieved, as hierarchical GET can work from any level within the tree.

Another aspect of hierarchical GET is filtering in some embodiments. An administrator in these embodiments can filter out the intent tree to see only the types that she is interested in. This filtering can be a simple type-based filtering, e.g., the administrator can say GET the intent hierarchy for type "Domain". In an advanced filtering mechanism, user can choose to retrieve intent based on features, e.g. the administrator can say GET all the resources in intent hierarchy related to firewall feature.

In some embodiments, user can perform hierarchical GET and club it with hierarchical POST. The administrator in some embodiments can retrieve the intent hierarchy, then modify and POST it back. This enables "import/export" use case. The administrator in some embodiments can also retrieve a manifest and store it. Subsequently, the administrator can restore the previously retrieved intent.

Figure 10:
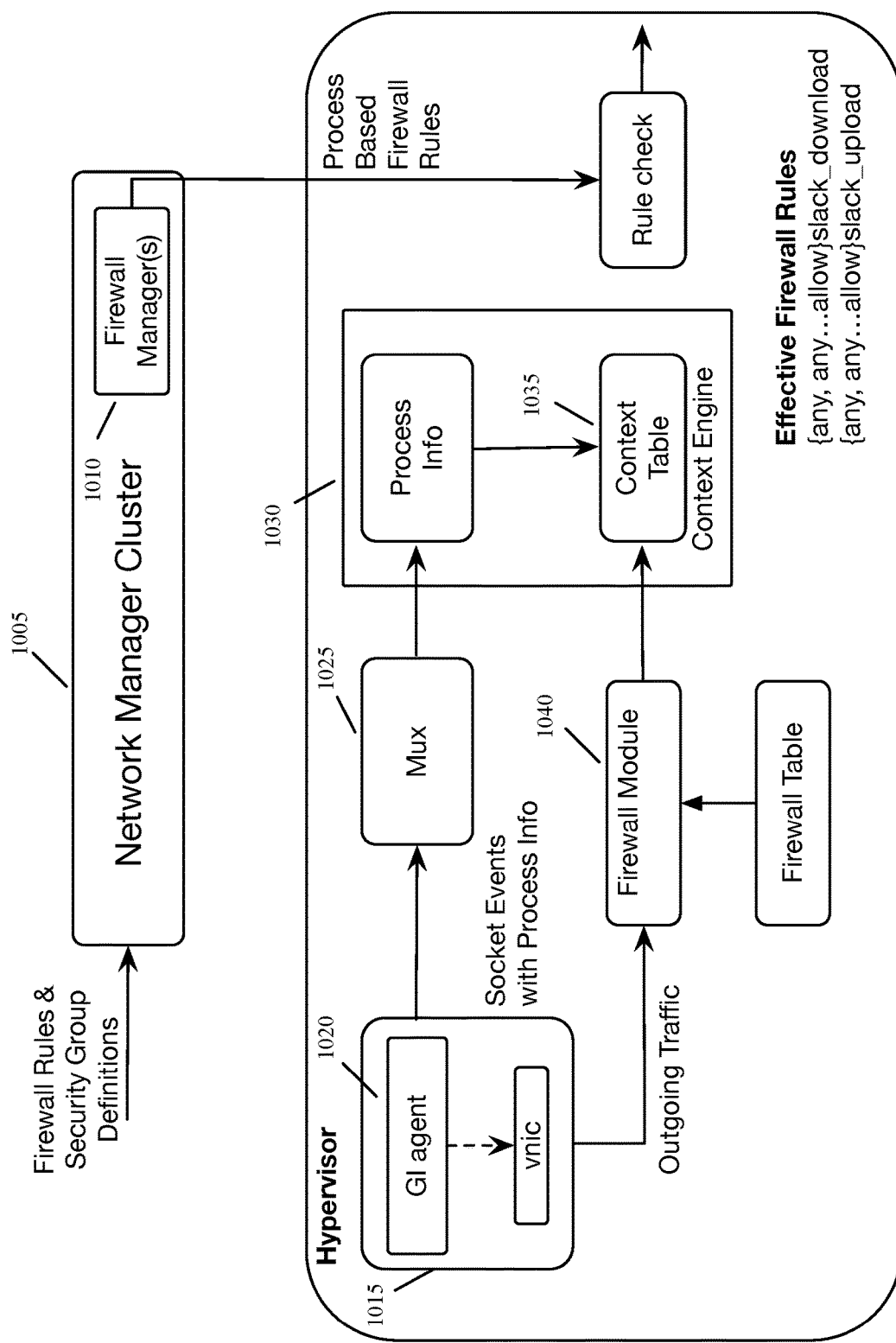
FIG. 10 illustrates how some embodiments enforce context-based firewall rules on host computers.

FIG. 10 illustrates how some embodiments enforce context-based firewall rules on host computers. In some embodiments, the SDDC achieves its desired segmentation communication profiles by defining and enforcing such context-based rules on host computers. As mentioned above, the manifest-processing framework translates the communication profile rules defined in the manifest which are converted to rules that the network management layer (i.e., the network manager cluster) can process to achieve the required micro-segmentation for the application.

FIG. 10 shows the network management cluster receiving a set of rules that map these application segments defined in the manifest to security groups based on process names/hash by using the grouping provider. The network management cluster also receives the translated firewall rules matching these process-based groups based on the communication profiles defined in the manifest. Once the process based groups and the firewall rules are created, firewall managers 1010 of the manager cluster 1005 distribute the rules to the host computers and other enforcement nodes in the SDDC.

To map files, modules, and other process data to a network event, some embodiments use contextual data captured through guest introspection (GI) agents 1020 executing on machines 1015 (e.g., host VMs and containers). GI agents 1020 in some embodiments capture any guest network connection and file access and its associated process context. In some embodiments, all network connections and file access are intercepted by this agent and sent to the context service engine 1030 running on the host. In the ESX hypervisor provided by Vmware Inc., the contextual data is sent to the context engine 1030 through a hypervisor component called a Mux 1025, which acts as a conduit to send the network and file events from the GI agents to the context engine executing on the host computer. Using this information, the context engine updates the context table 1035 that contains information about the user, source IP address, source port, protocol, and the process information that are initiated by the guest VM.

When the data compute machine 1015 subsequently makes a network connection, a firewall module 1040 executing on the host computer inspects the outgoing packet, associates the process information with the packet flow from the context table, and matches it with the rules in the firewall table thereby enforcing the effective firewall rules at the process level. This level of fine grained control of the processes running on the VM's helps the administrator detect unsanctioned software/applications installed in the environment and further block malicious processes running in the system. The effective rule realization is communicated back to the network management cluster, which provides the status of the application deployed and the effective rules to the administrator. Context based firewalls and other middlebox service engines are further described in U.S. patent application Ser. No. 15/650,251, which is published as 2018-0181423 and incorporated herein by reference.

The manifest-processing framework in some embodiments has an intent based learning engine. Using the GI agent installed on the guest machines (e.g., guest VMs or containers), the manifest-processing framework can not only identify the processes involved in the detected network activities but also the installed binaries and the file attributes associated with these activities. Some of the most common attributes includes file hash, publisher information, installation path, and the certificate. In some embodiments, these identified processes and other attributes are collected from the deployment environment (e.g., from the host computers) and analyzed by the learning engine, in order to produce new multi-segment application templates. The collected and analyzed data shows how some administrators typically deploy multi-segment applications (e.g., new multi-segment applications). The learning engine in some embodiments discerns the common deployment attributes from the collected data, and based on its analysis, recommends new multi-segment manifest templates.

Figure 11:
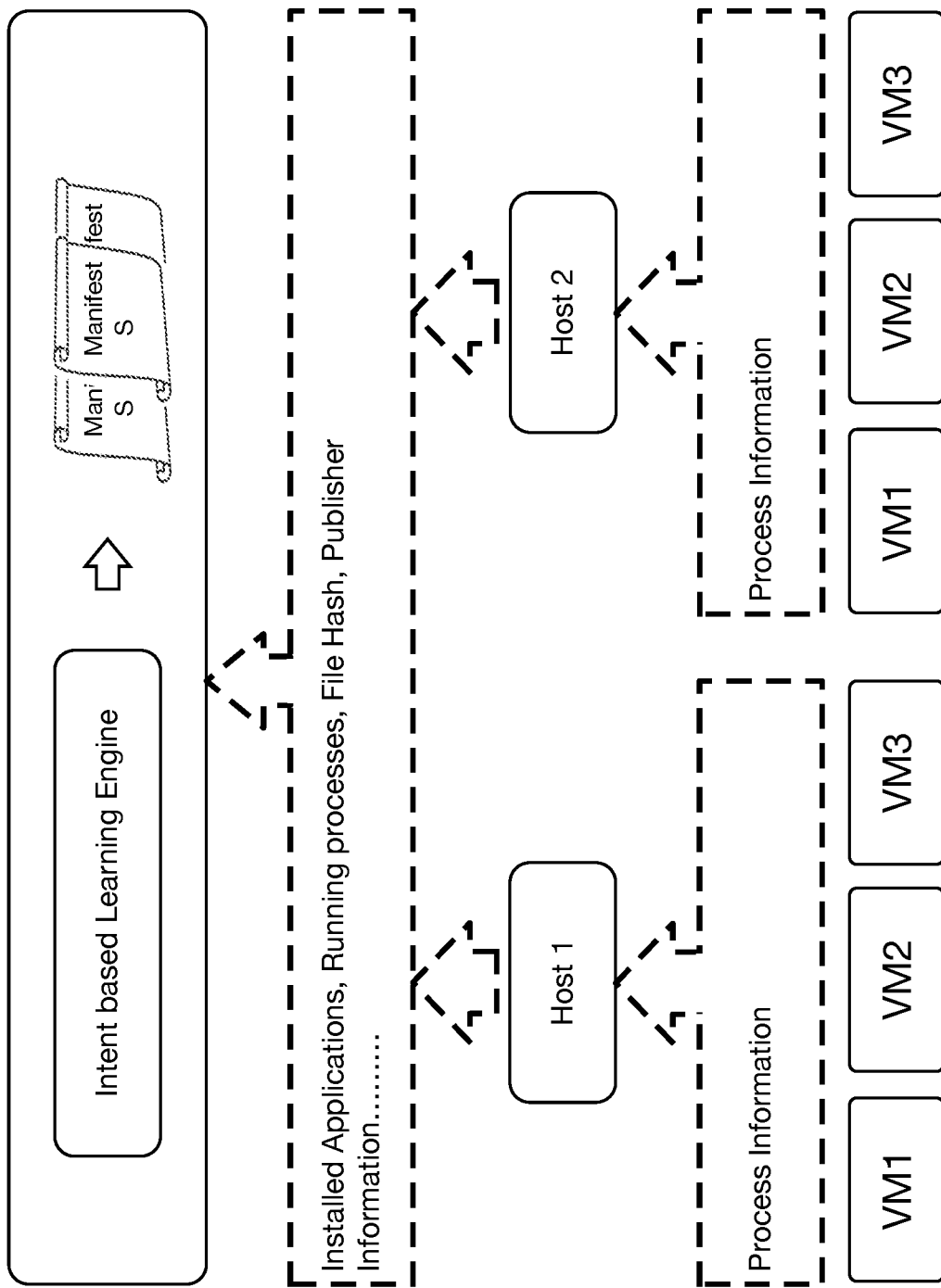
FIG. 11 illustrates an example of data collection for learning about deployments of multi-segmented applications in a datacenter.

As mentioned above, the network and file events captured by the GI agents are stored in the context table. From here, the manifest-processing framework can collect data regarding these captured events as shown in FIG. 11. In some embodiments, this data is collected in a separate server cluster or set of appliances, as the data can grow very large depending on the collection time and the application workload. This information is stored at a host level about all the processes seen on each VM in the host.

In some embodiment, the collected network and file event data is then aggregated and modeled to generate application templates customized to obtain the right segmentation at a process level within a VM. For each network event, the GI agent can get the corresponding process, socket, rate of connections, and type of connection. The framework in some embodiments has the communication channels established to query the libraries used by the process at that instance and the files which are accessed by the process.

This data in addition with round trip time, time of the day, and correlation with other processes is used in some embodiments to train an unsupervised or semi supervised machine learning model. Some embodiments use a One-Class Support Vector Machine (SVM) classifier for identifying the process information. The SVM module is useful in scenarios where there is a lot of "normal" data, and there are not many cases of the anomalies that need to be detected.

One-class SVM is an unsupervised algorithm that learns a decision function for novelty detection: classifying new data as similar or different to the training set. SVMs are supervised learning models that can be used for classification tasks. Typically, an SVM is given labelled data that can be mapped to an n-d space. The different categories are divided by a clear gap, and the SVM finds the one that is as wide as possible. The new data samples are classified belonging to a category based on which side of the gap they fall in. Some embodiments classify or process information based on new data seen and recommend the right set of application templates that the administrator needs to protect their network. Using this model, some embodiments are able to predict the running applications and their corresponding processes. In this manner, the model helps identify new applications and recommend the right application template to secure the application.

The above-described embodiments offer several advantages. They provide an intent-based API processing system for deploying multi-segmented applications through a hierarchical API data model that allows the users to specify their intent (e.g., several application segments and the communication profiles between them) without worrying about the mechanics of persisting and realizing these resources. In some embodiments, the intent-based API system allows the users to define hierarchical API commands by using a simple declarative language that refers to a simplified hierarchical data model. Each hierarchical API command can define multiple SD resources at multiple resource levels in the SDDC without requiring earlier API commands to create certain SD resources before others. In fact, one hierarchical command can be used in some embodiments to define all the SD resources for one user (e.g., one tenant) of the SDDC (e.g., of a multi-tenant SDDC).

The manifest-processing framework of some embodiments leverages the hierarchy of the data model to provide a process for accepting, validating, and realizing parts or the whole of the hierarchy in a single API invocation. This system leverages the inherent knowledge of the data model to identify dependencies and invoke the underlying services in the right order, both for persistence and realization of the intent. Also, all of the persistence is done in a single transaction, thus making sure that the entire intent is accepted as an atomic unit.

Once the manifest-processing framework determines that the multi-segment application defined in the received manifest is deployable, the API system uses an asynchronous process in some embodiments to deploy resources automatically in the right order without further input from the administrator. This process works with one or more network, service, or compute managers to deploy or update one or more network, service, or compute resources based on a work order that is appropriate for the deployed resources.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
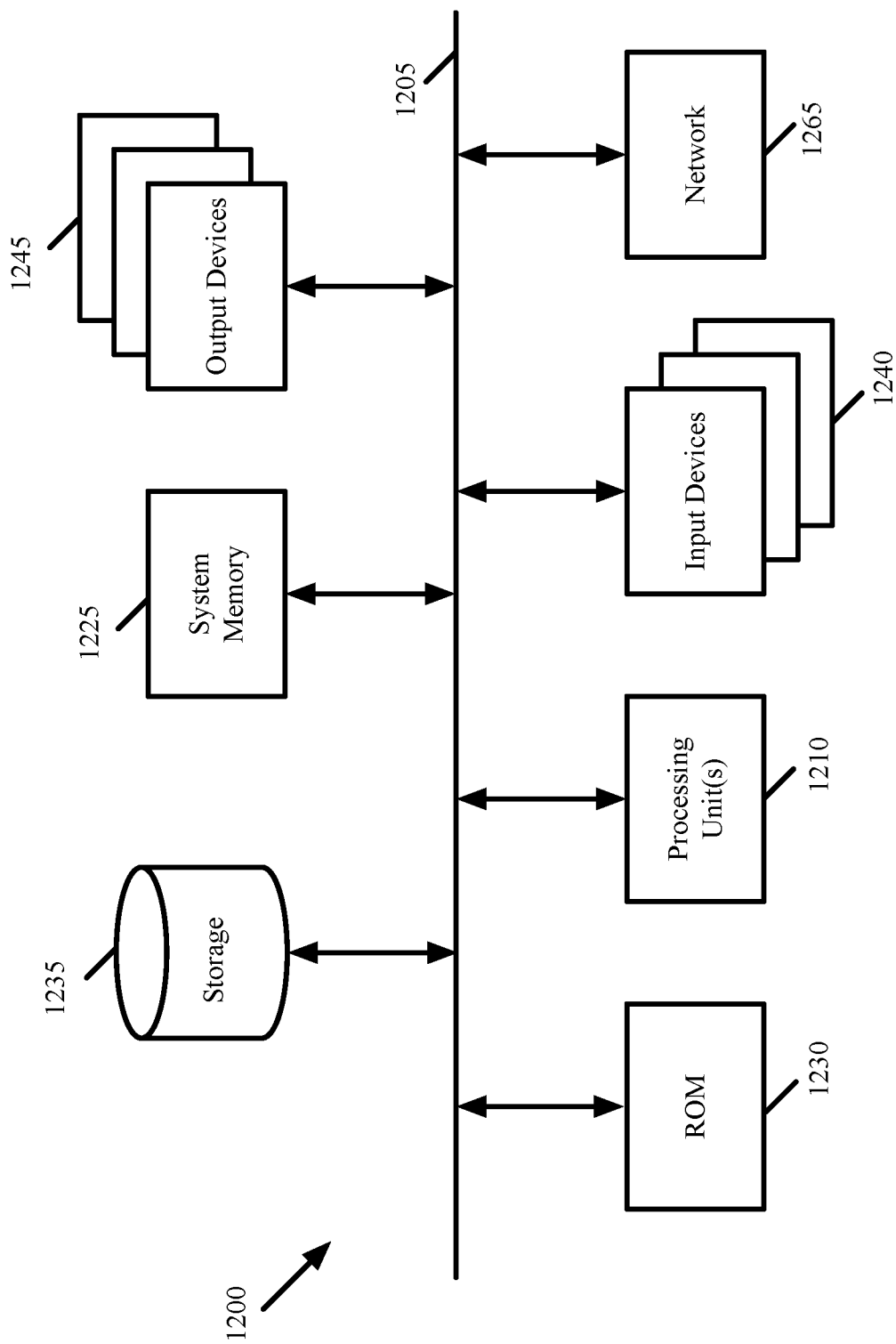
FIG. 12 conceptually illustrates a computer system with which some embodiments of the invention are implemented.

FIG. 12 conceptually illustrates a computer system 1200 with which some embodiments of the invention are implemented. The computer system 1200 can be used to implement any of the above-described hosts, controllers, and managers. As such, it can be used to execute any of the above described processes. This computer system includes various types of non-transitory machine readable media and interfaces for various other types of machine readable media. Computer system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the computer system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments. The read-only-memory (ROM) 1230 stores static data and instructions that are needed by the processing unit(s) 1210 and other modules of the computer system. The permanent storage device 1235, on the other hand, is a read-and-write memory device. This device is a non-volatile memory unit that stores instructions and data even when the computer system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the computer system. The input devices 1240 include alphanumeric keyboards and pointing devices (also called "cursor control devices"). The output devices 1245 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 12, bus 1205 also couples computer system 1200 to a network 1265 through a network adapter (not shown). In this manner, the computer can be a part of a network of computers (such as a local area network ("LAN"), a wide area network ("WAN"), or an Intranet), or a network of networks (such as the Internet). Any or all components of computer system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of deploying resources in a software defined datacenter (SDDC), the method comprising:
   receiving a hierarchical Application Programming Interface (API) command that comprises a plurality of requests to deploy a plurality of resources in the SDDC;
   parsing the hierarchical API command to identify the plurality of requests to deploy the plurality of resources using an API processor, the hierarchical API command comprising a plurality of commands associated with one or more application segments of a multi-segmented application;
   defining a sorted order, based at least on the plurality of commands associated with the one or more application segments of the multi-segmented application, for the plurality of requests using the API processor;
   based on the sorted order, providing the plurality of requests to a set of servers to deploy the plurality of resources using the API processor.

2. The method of claim 1, wherein the plurality of resources further includes managed forwarding elements for forwarding data messages between the application segments.

3. The method of claim 1, wherein the plurality of resources further includes middlebox service elements for performing middlebox service operations on data messages sent to or from the application segments.

4. The method of claim 3, wherein the middlebox service operations include at least one of firewall operations, load balancing operations, network address translation operations, encryption operations, intrusion detection operations, and intrusion prevention operations.

5. The method of claim 1, wherein the multi-segmented application has at least three application segments defined in the hierarchical API command.

6. The method of claim 1, wherein the multi-segmented application has more than five application segments defined in the hierarchical API command.

7. The method of claim 1, wherein the plurality of deployed resources comprises at least one virtual machine or container.

8. The method of claim 1, wherein
   the hierarchical API command includes a set of parameters to update an earlier deployed machine, and
   deploying the plurality of resources comprises updating the earlier deployed machine based on a set of parameters specified in the parsed hierarchical API command.

9. The method of claim 1, wherein
   the hierarchical API command includes a set of parameters to update an earlier deployed set of rules, and
   deploying the plurality of resources comprises updating the earlier provided set of rules based on a set of parameters specified in the parsed hierarchical API command.

10. The method of claim 1, wherein the plurality of commands comprises a first command and a second command, the first command is associated with a first resource type, the second command is associated with a second resource type, and the second command is nested under the first command.

11. The method of claim 10, wherein the sorted order is determined based at least on the first resource type and the second resource type.

12. A non-transitory machine readable medium storing a program, which when executed by at least one processing unit, deploys resources in a software defined datacenter (SDDC), the program comprising sets of instructions for:
   receiving a hierarchical Application Programming Interface (API) command that specifies a plurality of resources to deploy in the SDDC;
   parsing the hierarchical API command to identify a plurality of requests to deploy the plurality of resources using an API processor, the hierarchical API command comprising a plurality of commands associated with one or more application segments of a multi-segmented application;
   defining a sorted order, based at least on the plurality of commands associated with the one or more application segments of the multi-segmented application, for the plurality of requests using the API processor;

based on the sorted order, providing the plurality of requests to a set of servers to deploy the plurality of resources using the API processor.

13. The non-transitory machine readable medium of claim 12, wherein the plurality of resources further include managed forwarding elements for forwarding data messages between the application segments.

14. The non-transitory machine readable medium of claim 12, wherein the plurality of resources further include middlebox service elements for performing middlebox service operations on data messages sent to or from the application segments.

15. The non-transitory machine readable medium of claim 14, wherein the middlebox service operations include at least one of firewall operations, load balancing operations, network address translation operations, encryption operations, intrusion detection operations, and intrusion prevention operations.

16. The non-transitory machine readable medium of claim 12, wherein the multi-segmented application has at least three application segments defined in the hierarchical API command.

17. The non-transitory machine readable medium of claim 12, wherein the multi-segmented application has more than five application segments defined in the hierarchical API command.

18. The non-transitory machine readable medium of claim 12, wherein the plurality of deployed resources comprises at least one virtual machine or container.

19. The non-transitory machine readable medium of claim 12, wherein
the hierarchical API command includes a set of parameters to update an earlier deployed machine, and
the set of instructions for deploying the plurality of resources comprises a set of instructions for updating the earlier deployed machine based on a set of parameters specified in the parsed hierarchical API command.

20. The non-transitory machine readable medium of claim 12, wherein
the hierarchical API command includes a set of parameters to update an earlier deployed set of rules, and
the set of instructions for deploying the plurality of resources comprises a set of instructions for updating the earlier provided set of rules based on a set of parameters specified in the parsed hierarchical API command.

* * * * *